(12) United States Patent
Li et al.

(10) Patent No.: US 9,391,030 B1
(45) Date of Patent: Jul. 12, 2016

(54) ON-CHIP SEMICONDUCTOR DEVICE HAVING ENHANCED VARIABILITY

(71) Applicant: International Business machines Corporation, Armonk, NY (US)

(72) Inventors: Wai-Kin Li, Beacon, NY (US); Chengwen Pei, Danbury, CT (US); Ping-Chuan Wang, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/625,943

(22) Filed: Feb. 19, 2015

(51) Int. Cl.
| | |
|---|---|
| H01L 21/302 | (2006.01) |
| H01L 23/00 | (2006.01) |
| H01L 27/088 | (2006.01) |
| H01L 29/423 | (2006.01) |
| H01L 21/8236 | (2006.01) |
| H01L 21/28 | (2006.01) |

(52) U.S. Cl.
CPC ........ *H01L 23/573* (2013.01); *H01L 21/28158* (2013.01); *H01L 21/8236* (2013.01); *H01L 27/0883* (2013.01); *H01L 29/42368* (2013.01)

(58) Field of Classification Search
USPC ....................................................... 257/392
See application file for complete search history.

(56) References Cited

U.S. PATENT DOCUMENTS

| | | |
|---|---|---|
| 8,525,549 B1 | 9/2013 | Feng et al. |
| 2010/0322418 A1 | 12/2010 | Potkonjak |
| 2011/0163088 A1 | 7/2011 | Besling et al. |
| 2011/0254141 A1 | 10/2011 | Roest et al. |
| 2013/0233608 A1 | 9/2013 | Feng et al. |

OTHER PUBLICATIONS

B. Gassend et al, "Controlled Physical Random Functions," Proceedings of the 18th Annual Computer Security Applications Conference (ACSAC '02), Copyright 2002 IEEE, pp. 1-12.
D. Puntin et al, "CMOS Unclonable System for Secure Authentication Based on Device Variability," Copyright 2008 IEEE, pp. 130-133.
J. Guajardo et al., "Physical Unclonable Functions and Public-Key Crypto for FPGA IP Protection," Copyright 2007 IEEE, pp. 187-195.
J. Li et al, "At-Speed Delay Characterizations for IC Authentication and Trojan Horse Detection," 2008 IEEE International Workshop on Hardware-Oriented Security and Trust, Anaheim, CA, Jun. 9, 2008, pp. 1-7.

(Continued)

*Primary Examiner* — Elias M Ullah
(74) *Attorney, Agent, or Firm* — Cantor Colburn LLP; Steven Myers

(57) ABSTRACT

A physical unclonable function (PUF) semiconductor device includes a semiconductor substrate extending along a first direction to define a length and a second direction opposite the first direction to define a thickness. At least one pair of semiconductor structures is formed on the semiconductor substrate. The semiconductor structures include a first semiconductor structure and a second semiconductor structure. The first semiconductor structure includes a first gate dielectric layer having a first shape that defines a first threshold voltage. The second semiconductor structure includes a second gate dielectric layer having a second dielectric shape that is reversely arranged with respect to the first shape and that defines a second threshold voltage different from the first threshold voltage.

10 Claims, 18 Drawing Sheets

(56) References Cited

OTHER PUBLICATIONS

K. Lofstrom et al., "IC Identification Circuit Using Device Mismatch," 2000 IEEE International Solid-State Circuits Conference, Copyright 2000 IEEE, pp. 1-2.

Kai D. Feng et al., "Embedded On-Chip Security", U.S. Appl. No. 14/032,218, filed Sep. 20, 2013.

Kai D. Feng et al., "On-chip Structure for Security Application", U.S. Appl. No. 14/096,345, filed Dec. 4, 2013.

Kai D. Feng et al., "Semiconductor Device Including Enhanced Variability", U.S. Appl. No. 14/158,917, filed Jan. 20, 2014.

List of IBM Patents or Patent Applications Treated as Related; (Appendix P), Filed Feb. 19, 2015; 2 pages.

S. Maeda et al., "An Artificial Fingerprint Device (AFD): A Study of Identification Number Applications Utilizing Characteristics Variation of Polycrystalline Silicon TFTs," IEEE Transactions on Electron Devices, vol. 50, No. 6, Jun. 2003, Copyright 2003.

S. S. Kumar et al., "Extended Abstract: The Butterfly PUF Protecting IP on Every FPGA," 2008 IEEE International Workshop on Hardware-Oriented Security and Trust, Anaheim, CA, Jun. 9, 2008.

Y. Alkabani et al., "Trusted Integrated Circuits: A Nondestructive Hidden Characteristics Extraction Approach," IH 2008, LNCS 5284, pp. 102-117, 2008; Copyright Springer-Verlag Berlin Heidelberg 2008.

Y. Su et al., "A 1.6pJ/bit 96% Stable Chip-ID Generating Circuit Using Process Variations," 2007 IEEE International Solid-State Circuits Conference, Copyright 2007 IEEE, pp. 406-407, 611.

Kai D. Feng et al., "On-Chip Semiconductor Device Having Enhanced Variability", U.S Appl. No. 15/080,650, filed Mar. 25, 2016.

Kai D. Feng et al., "Physical Unclonable Interconnect Function Array", U.S. Appl. No. 15/060,685, filed Mar. 4, 2016.

List of IBM Patents or Patent Applications Treated as Related; (Appendix P), Filed Mar. 25, 2016; 2 pages.

Kai D. Feng et al., "Physical Unclonable Interconnect Function Array", U.S. Appl. No. 14/825,303, filed Aug. 13, 2015.

List of IBM Patents or Patent Applications Treated as Related; (Appendix P), Filed Aug. 19, 2015; 2 pages.

ON-CHIP SEMICONDUCTOR DEVICE HAVING ENHANCED VARIABILITY

BACKGROUND

The present invention relates to semiconductor devices, and more specifically, to a semiconductor device including a physical unclonable function (PUF).

Device variability is typically caused by process variation(s), and it is much more substantial in smaller devices. Such variability is significant in proper circuit operation, and process improvements are made in order to tighten the device variability. Recently, device variability is being sought and applied to enforce security in information technology. As the security of internet-related networks, circuits, and applications becomes ever more stringent, it has become desirable to protect the information shared among semiconductor device communication.

One approach for preventing the unauthorized cloning of semiconductor devices is the use of Physical Unclonable Function (PUF) to encode a physical semiconductor device with a random set of numerical bits. A PUF generates a set of numerical bits, for example, 128 bits to form a matrix "A" A calculation of Y=A*X is performed during operation of the PUF, where "A" is a matrix having elements generated from the PUF, "X" is an input vector called a "challenge," and "Y" is the output vector called the "response." The matrix "A" and the input vector should only be known to the chip owner such that only the owner may know if the response is correct.

The PUF is typically embodied in the physical semiconductor device, and introduced a random variation in the threshold voltage (Vt) between a pair of transistor structures which is easy to evaluate but hard to predict. Each pair of transistor structures outputs either a "0" bit or a "1" bit. The bits generated from the PUF in one chip must be fixed and constant over time. In addition, the correlation among the bits generated from different PUF chips must be random. A semiconductor device including a PUF must be easy to fabricate but practically impossible to duplicate (i.e., is unclonable), even given the manufacturing process that fabricates the device. Conventional methods of fabricating a semiconductor device including a PUF typically add one or more PUF fabrication processes into the standard semiconductor device process flow. The added PUF fabrication processes, however, can increase the overall cost to fabricate the semiconductor device.

SUMMARY

According to at least one non-limiting embodiment of the present invention, a physical unclonable function (PUF) semiconductor device includes a semiconductor substrate extending along a first direction to define a length and a second direction opposite the first direction to define a thickness. At least one pair of semiconductor structures is formed on the semiconductor substrate. The semiconductor structures include a first semiconductor structure and a second semiconductor structure. The first semiconductor structure includes a first gate dielectric layer having a first dielectric area that defines a first threshold voltage. The second semiconductor structure includes a second gate dielectric layer having a second dielectric area different from the first area that defines a second threshold voltage different from the first threshold voltage.

According to another non-limiting embodiment, a method of fabricating a physical unclonable function (PUF) semiconductor device comprises forming a first gate dielectric layer having a first dielectric area on a first active region of a semiconductor substrate, and forming a second gate dielectric layer having a second dielectric area different from the first dielectric area on a second active region of the semiconductor substrate. The method further includes forming a first semiconductor structure on the first gate dielectric layer to define a first threshold voltage of the first semiconductor structure, and forming a second semiconductor structure on the second gate dielectric layer to define a second threshold voltage of the second semiconductor structure that is different from the first threshold voltage.

According to yet another non-limiting embodiment, a method of fabricating a physical unclonable function (PUF) semiconductor device comprises forming a plurality of gate dielectric layers on a semiconductor substrate. Each gate dielectric layer has a gate dielectric area sized differently with respect to one another. The method further includes forming a semiconductor structure on each gate dielectric layer such that each semiconductor structure has a different threshold voltage with respect to one another.

According to another non-limiting embodiment, a physical unclonable function (PUF) semiconductor device comprises a plurality of gate dielectric layers on a semiconductor substrate. Each gate dielectric layer has a gate dielectric area that is different with respect to one another. A semiconductor structure is formed on each gate dielectric layer. Each semiconductor structure has a different threshold voltage with respect to one another.

According to still another non-limiting embodiment, a physical unclonable function (PUF) semiconductor array system comprises at least one pair of semiconductor structures on a semiconductor substrate. Each semiconductor structure includes a gate dielectric layer that defines a threshold voltage of a respective semiconductor structure. Each gate dielectric layer has a different gate dielectric area with respect to one another such that each threshold voltage is different from one another. A microcontroller is configured to apply an input voltage to each semiconductor structure and to determine the threshold voltage of each semiconductor device in response to the input voltage. The microcontroller determines a voltage differential based on the threshold voltage of each semiconductor device, and assigns a binary bit to the at least one pair of semiconductor structures based on a comparison between the voltage differential and a threshold value.

Additional features are realized through the techniques of the present invention. Other embodiments are described in detail herein and are considered a part of the claimed invention. For a better understanding of the invention with the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing features are apparent from the following detailed description taken in conjunction with the accompanying drawings in which:

FIGS. 2-8 are a series of diagrams illustrating a process flow of fabricating a PUF semiconductor device having a random variation in gate lengths according to a non-limiting embodiment, in which:

FIG. 2 is a cross-sectional view of a starting semiconductor-on-insulator (SOI) substrate including first and second active regions separated from one another by a shallow trench isolation region (STI) according to a non-limiting embodiment;

FIG. 3 illustrates the starting substrate of FIG. 2 following an oxidation process that forms an oxide layer within each active region;

FIG. 4 illustrates the starting substrate of FIG. 3 including first and second oxide layers formed in the active semiconductor layers following the oxidation process;

FIG. 5 illustrates the substrate of FIG. 4 after depositing a block photoresist layer on the upper surface of the PUF semiconductor device;

FIG. 6 illustrates the substrate of FIG. 5 after performing a photolithography process that patterns openings in the photoresist layer to exposes portions of the oxide layer;

FIG. 7 illustrates the substrate of FIG. 6 after partially recessing the exposed portions of the oxide layers;

FIG. 8 illustrates the substrate of FIG. 7 after removing the remaining photoresist layer to expose a first oxide layer including first and second oxide layer portions and a second oxide layer including first and second oxide layer portions;

FIGS. 11-17 are a series of diagrams illustrating a process flow of fabricating a PUF semiconductor device having a random variation in gate lengths according to another non-limiting embodiment, in which:

FIG. 11 illustrates a substrate following a photolithography process that patterns openings in the photoresist layer to exposes portions of an initial oxide layer formed according to a first oxidation process;

FIG. 12 illustrates the substrate of FIG. 11 after completely recessing the exposed portions of the oxide layer to expose portions of the underlying active semiconductor layer;

FIG. 13 illustrates the substrate of FIG. 12 undergoing a second oxidation process;

FIG. 14 illustrates the substrate of FIG. 13 following the second oxidation process that forms a second oxide layer portions from respective portions of the exposed active semiconductor layer;

FIG. 15 illustrates the substrate of FIG. 14 after removing the remaining photoresist layer to expose an upper surface of including a first oxide layer having a second oxide layer portion that is thinner than the remaining initial oxide layer portion, and a second oxide layer having a second oxide layer portion that is thinner than the remaining initial oxide layer portion;

FIG. 16 illustrates the substrate of FIG. 15 following formation of a first gate structure on the first oxide layer and a second gate structure on the second oxide layer; and FIG. 17 illustrates the substrate of FIG. 16 after etching portions of the first and second oxide layers to expose source/drain regions on the active semiconductor layers and after forming source/drain elements on respective source/drain regions to form a PUF semiconductor device that introduces a random variation in threshold voltages of a first gate structure and a second gate structure.

DETAILED DESCRIPTION

Various embodiments of the invention provide a PUF semiconductor device including a pair of large metal oxide field effect transistor (MOSFET) structures that introduce a random variation in the threshold voltage (Vt) of the device without requiring additional PUF fabrication processes. The large MOSFET structures includes a channel length ranging, for example, from approximately 60 nanometers (nm) to approximately 120 nm, which improves stability while still providing acceptable variations in Vt.

Unlike conventional semiconductor devices that implement additional PUF fabrication processes into the standard semiconductor device fabrication process flow, at least one embodiment of the invention induces variation of the Vt through variation in the gate dielectric thickness of a pair of transistor structure. For instance, as the thickness of the gate dielectric is reduced, the amount of voltage necessary to switch on the respective transistor structure is also reduced. That is, the offset of threshold voltage from each pair of transistors above is self-enhanced, i.e., with one transistor having lower Vt, the other transistor (necessarily) having higher Vt. Therefore, at least one embodiment of the invention randomly varies the gate dielectric layer of each transistor structures to introduce a variation in the Vt between the first transistor structure and the Vt of the second transistor structure.

The variation in the gate dielectric thickness can be adjusted when forming the gate structure of the semiconductor device, thereby excluding the need to incorporate additional PUF processes into the semiconductor fabrication process. For example, at least one non-limiting embodiment provides PUF device including an array of transistor pairs, where each pair of transistors has gate dielectric not only non-uniform but also asymmetric in an opposite way (i.e., thickness and length). Accordingly, costs for fabricating a PUF semiconductor device are reduced.

According to another embodiment, a method of fabricating a PUF device (e.g., a transistor pair, or further the gate oxide of the transistor pair) utilizes a single blocking litho/resist that partially covers both transistors. However, a first portion of a first transistor is exposed more to the litho etch than a similar portion of a second transistor. Accordingly, the gate dielectric of the first transistor and the second gate dielectric of the second transistor are fabricated in a non-uniform manner, which necessarily forms opposite, shapes/areas of the gate dielectrics. Thus, the transistor pair, i.e., the non-uniform gate dielectrics, is asymmetric in an opposite way in length and thickness for each pair with respect to each other, but can be simultaneously fabricated along an identical process flow using a blocking mask which exists in process flow (i.e., fabricated in reverse with respect to one another). Therefore, no extra process, mask or costs are required.

Figure 1:
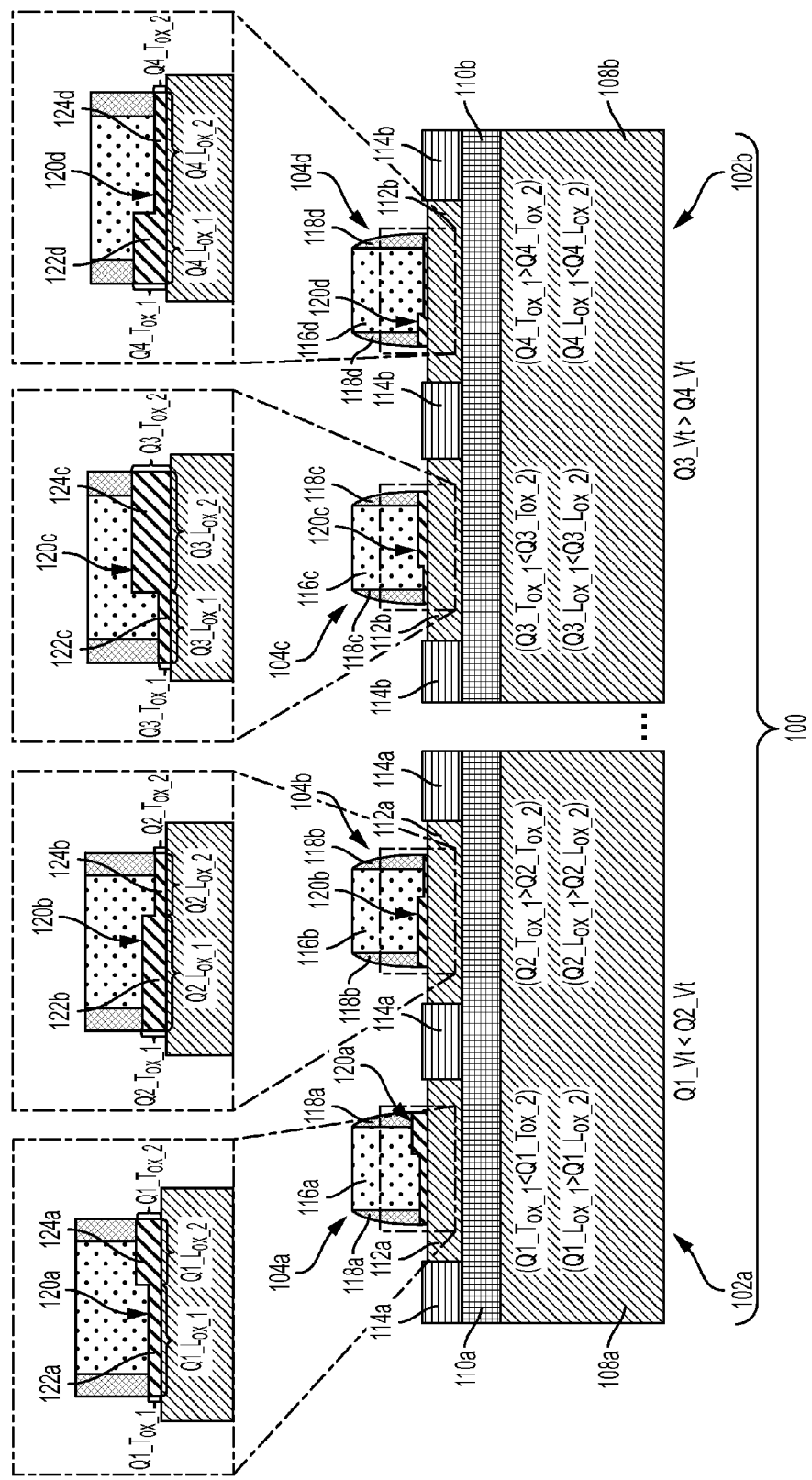
FIG. 1 is a cross-sectional view of a PUF semiconductor device including a plurality of transistor structure pairs having random variations in the gate oxide thickness to generate random variations in the threshold voltage of the device according to at least one non-limiting embodiment of the invention.

With reference now to FIG. 1, a PUF semiconductor device 100 is illustrated according to a non-limiting embodiment. The PUF semiconductor device 100 includes one or more device structures 102a-102b on a single wafer (not shown). It should be appreciated that although a first device structure 102a and a second device structure 102b are shown, the invention is not limited thereto.

The first device structure 102a includes first and second semiconductor gate structures 104a-104b formed on a first semiconductor substrate 106a. The first semiconductor substrate 106a includes, for example, a semiconductor-on-insulator (SOI) substrate 106a. According to an embodiment, the first SOI substrate 106a includes a bulk substrate layer 108a, a buried insulator layer 110a formed on an upper surface of the bulk substrate layer 108a, and one or more active semiconductor layers 112a formed on an upper surface of the buried insulator layer 110a. The bulk semiconductor layer 108a comprises, for example, silicon (Si). The buried insulator layer 110a comprises, for example, silicon oxide ($SiO_2$). The active semiconductor layers 112a comprise, for example, Si. The SOI substrate 106a further includes one or more shallow trench isolation (STI) regions 114a that electrically isolate the active semiconductor layers 112a from each other. The STI regions 114a comprise, for example, $SiO_2$.

The first and second gate structures 104a-104 are formed on an upper surface of a respective active semiconductor region 112a. The first gate structure 104a includes a first gate electrode 116a, and spacers 118a formed on sidewalls of the gate electrode 116a as understood by one of ordinary skill in the art. The first gate structure 104a further includes a first gate dielectric layer 120a comprising, for example, $SiO_2$. The first gate dielectric layer 120a is interposed between the first gate structure 104a and the active semiconductor layer 112a.

Still referring to FIG. 1, the first gate dielectric layer 120a includes a first gate portion 122a and a second gate portion 124a. The first gate portion 122a has a first gate thickness (Q1_Tox_1) and a first gate dielectric length (Q1_Lox_1). The first gate thickness (Q1_Tox_1) and the first gate dielectric length (Q1_Lox_1) create a first shape that defines a first gate dielectric area of the first gate portion 122a. According to a non-limiting embodiment, the first gate dielectric area is about 20% to about 80% of total gate dielectric length of 120a, and may have the same width as the first gate dielectric layer 120a. For example, the total gate dielectric area has dimensions of about 20 nm to about 80 nm in length, about 40 nm to about 200 nm in width, and is about 0.5 nm to about 4 nm thick.

The second gate portion 124a has a second gate dielectric thickness (Q1_Tox_2) and a second gate dielectric length (Q1_Lox_2). The second gate thickness (Q1_Tox_2) and the second gate dielectric length (Q1_Lox_2) create a second shape that defines a second gate dielectric area of the second gate portion 124a. The second shape of the second gate dielectric layer 120b i.e. is reversely arranged with respect to the first gate dielectric layer 120. According to a non-limiting embodiment, the second gate dielectric layer ranges, for example, from about 20 nm to about 50 nm in length, and is about 2 nm to about 10 nm thick.

According to a non-limiting embodiment, the second gate dielectric length (Q1_Lox_2) is sized differently than the first gate dielectric length (Q1_Lox 1). For example, the second gate dielectric length (Q1_Lox_2) is less than the first gate dielectric length (Q1_Lox 1). In addition, the second gate dielectric thickness (Q1_Tox_2) is sized differently than the first gate dielectric thickness (Q1_Tox_1). For example, the first gate dielectric thickness (Q1_Tox_1) is less than (i.e., thinner) the second gate dielectric thickness (Q1_Tox_2).

Turning to the second gate structure 104b shown in FIG. 1, a second gate electrode 116b includes spacers 118b formed on the gate electrode sidewalls as understood by one of ordinary skill in the art. The second gate structure 104b further includes a second gate dielectric layer 120b comprising, for example, $SiO_2$. The second gate dielectric layer 120b is interposed between the second gate structure 104b and the respective active semiconductor layer 112a.

The second gate dielectric layer 120b includes a first gate portion 122b and a second gate portion 124b. The first gate portion 122b has a first gate dielectric thickness (Q2_Tox_1) and a first gate dielectric length (Q2_Lox_1). The first gate thickness (Q2_Tox_1) and the first gate dielectric length (Q2_Lox_1) define a first gate dielectric area of the first gate portion 122b. The second gate portion 124b has a second gate dielectric thickness (Q2_Tox_2) and a second gate dielectric length (Q2_Lox_2). The second gate thickness (Q2_Tox_2) and the second gate dielectric length (Q2_Lox_2) define a second gate dielectric area of the second gate portion 124b.

Similar to the first gate dielectric layer 120a, the second gate dielectric layer 120b has a second gate dielectric length (Q2_Lox_2) that is sized differently than a first gate dielectric length (Q2_Lox_1), and has a second gate dielectric thickness (Q2_Tox_2) that is sized differently than the first gate dielectric thickness (Q2_Tox_1). For example, the second gate dielectric length (Q2_Lox_2) is less than the first gate dielectric length (Q2_Lox_1). Unlike the first gate dielectric layer 120a, however, the second gate dielectric layer 120b has a first gate dielectric thickness (Q2_Tox_1) that is greater than (i.e., thicker) than the second gate dielectric thickness (Q2_Tox_2).

Accordingly, at least one non-limiting embodiment provides a first device structure 102a where an overall gate dielectric area of the first gate dielectric layer 120a is different than the overall gate dielectric area of the second gate dielectric layer 120b. For example, the overall gate dielectric area of the first gate dielectric layer 120a is less than the overall gate dielectric area of the second gate dielectric layer 120b. In this manner, the threshold voltage (Q1_Vt) of the first gate structure 104a is less than the threshold voltage (Q2_Vt) of the second gate structure 104b.

Turning now to the second device structure 102b shown in FIG. 1, third and fourth semiconductor gate structures 104c-104d are formed on a second semiconductor substrate 106b. Similar to the first semiconductor substrate 106a, the second semiconductor substrate 106b includes, for example, a semiconductor-on-insulator (SOI) substrate 106b. According to an embodiment, the second SOI substrate 106b includes a bulk substrate layer 108b, a buried insulator layer 110b formed on an upper surface of the bulk substrate layer 108b, and one or more active semiconductor layers 112b formed on an upper surface of the buried insulator layer 110b. The bulk semiconductor layer 108b comprises, for example, silicon (Si). The buried insulator layer 110b comprises, for example, silicon oxide ($SiO_2$). The active semiconductor layers 112b comprise, for example, Si. The SOI substrate 106b further includes one or more shallow trench isolation (STI) regions 114b that electrically isolate the active semiconductor layers 112b from each other. The STI regions 114b comprise, for example, $SiO_2$.

The third and fourth gate structures 104c-104c are formed on an upper surface of a respective active semiconductor region 112b. The third gate structure 104c includes a gate electrode 116c, and spacers 118c formed on sidewalls of the gate electrode 116c as understood by one of ordinary skill in the art. The third gate structure 104c further includes a first gate dielectric layer 120c comprising, for example, $SiO_2$. The first gate dielectric layer 120c is interposed between the third gate structure 104c and the respective active semiconductor layer 112b.

Still referring to FIG. 1, the first gate dielectric layer 120c includes a first gate portion 122c and a second gate portion 124c. The first gate portion 122c has a first gate dielectric thickness (Q3_Tox_1) and a first gate dielectric length (Q3_Lox_1). The first gate thickness (Q3_Tox_1) and the first gate dielectric length (Q3_Lox_1) define a first gate dielectric area of the first gate portion 122c. According to a non-limiting embodiment, the first gate dielectric area ranges, for example, from about 20 nm to about 80 nm in length, about 40 nm to about 200 nm in width, and is about 0.5 nm to about 4 nm thick.

The second gate portion 124c has a second gate dielectric thickness (Q3_Tox_2) and a second gate dielectric length (Q3_Lox_2). The second gate thickness (Q3_Tox_2) and the second gate dielectric length (Q3_Lox_2) define a second gate dielectric area of the second gate portion 124c. According to a non-limiting embodiment, the second dielectric area ranges, for example, from about 60 nm to about 120 nm in length, about 40 nm to about 200 nm in width, is about 1 nm to about 4 nm thick.

According to a non-limiting embodiment, the second gate dielectric length (Q3_Lox_2) is sized differently than the first gate dielectric length (Q3_Lox_1). For example, the second gate dielectric length (Q3_Lox_2) is greater than the first gate dielectric length (Q3_Lox_1). In addition, the second gate dielectric thickness (Q3_Tox_2) is sized differently than the first gate dielectric thickness (Q3_Tox_1). For example, the first gate dielectric thickness (Q3_Tox_1) is less than (i.e., thinner) than the second gate dielectric thickness (Q3_Tox_2).

Turning to the fourth gate structure 104d shown in FIG. 1, a fourth gate electrode 116d includes spacers 118d formed on the gate electrode sidewalls as understood by one of ordinary skill in the art. The second gate structure 104d further includes a second gate dielectric layer 120d comprising, for example, SiO₂. The second gate dielectric layer 120d is interposed between the second gate structure 104d and the respective active semiconductor layer 112b.

The second gate dielectric layer 120d includes a first gate portion 122d and a second gate portion 124d. The first gate portion 122d has a first gate dielectric thickness (Q4_Tox_1) and a first gate dielectric length (Q4_Lox_1). The first gate thickness (Q4_Tox_1) and the first gate dielectric length (Q4_Lox_1) define a first gate dielectric area of the first gate portion 122d. The second gate portion 124d has a second gate dielectric thickness (Q4_Tox_2) and a second gate dielectric length (Q4_Lox_2). The second gate thickness (Q4_Tox_2) and the second gate dielectric length (Q4_Lox_2) define a second gate dielectric area of the second gate portion 124d.

Similar to the third gate dielectric layer 120c, the second gate dielectric layer 120d has a second gate dielectric length (Q4_Lox_2) that is sized differently than a first gate dielectric length (Q4_Lox_1), and has a second gate dielectric thickness (Q4_Tox_2) that is sized differently than the first gate dielectric thickness (Q4_Tox_1). For example, the second gate dielectric length (Q4_Lox_2) is greater than the first gate dielectric length (Q4_Lox_1). Unlike the third gate dielectric layer 120c, however, the fourth gate dielectric layer 120d has a first gate dielectric thickness (Q4_Tox_1) that is greater than (i.e., thicker) than the second gate dielectric thickness (Q4_Tox_2).

Accordingly, at least one non-limiting embodiment provides a second device structure 102b where an overall gate dielectric area of the third gate dielectric layer 120c is different than the overall gate dielectric area of the fourth gate dielectric layer 120c. For example, the overall gate dielectric area of the third gate dielectric layer 120c is greater than the overall gate dielectric area of the fourth gate dielectric layer 120d. In this manner, the threshold voltage (Q3_Vt) of the third gate structure 104c is greater than the threshold voltage (Q4_Vt) of the fourth gate structure 104d.

As discussed in greater detail below, the difference in sizing between the first gate dielectric lengths (Q1_Lox_1-Q4_Lox_1) and the second gate dielectric length (Q1_Lox_2-Q4_Lox_2) occurs randomly during the fabrication of the gate dielectric layers 120a-120d. As a result, a first random threshold voltage differential is produced between the pair of structures 104a-104b of the first device 102a and a second random threshold voltage differential is provided between the second pair of structures 104c-104d of the second device 102b. Each threshold voltage differential can be compared to a respective threshold value to generate either a "0" bit output or a "1" bit output. Accordingly, at least one embodiment of the invention provides a PUF semiconductor device 100 that generates a random succession of "0" bits or "1" bits, which can be easily evaluated but hard to predict and/or practically impossible to duplicate.

Figure 2:
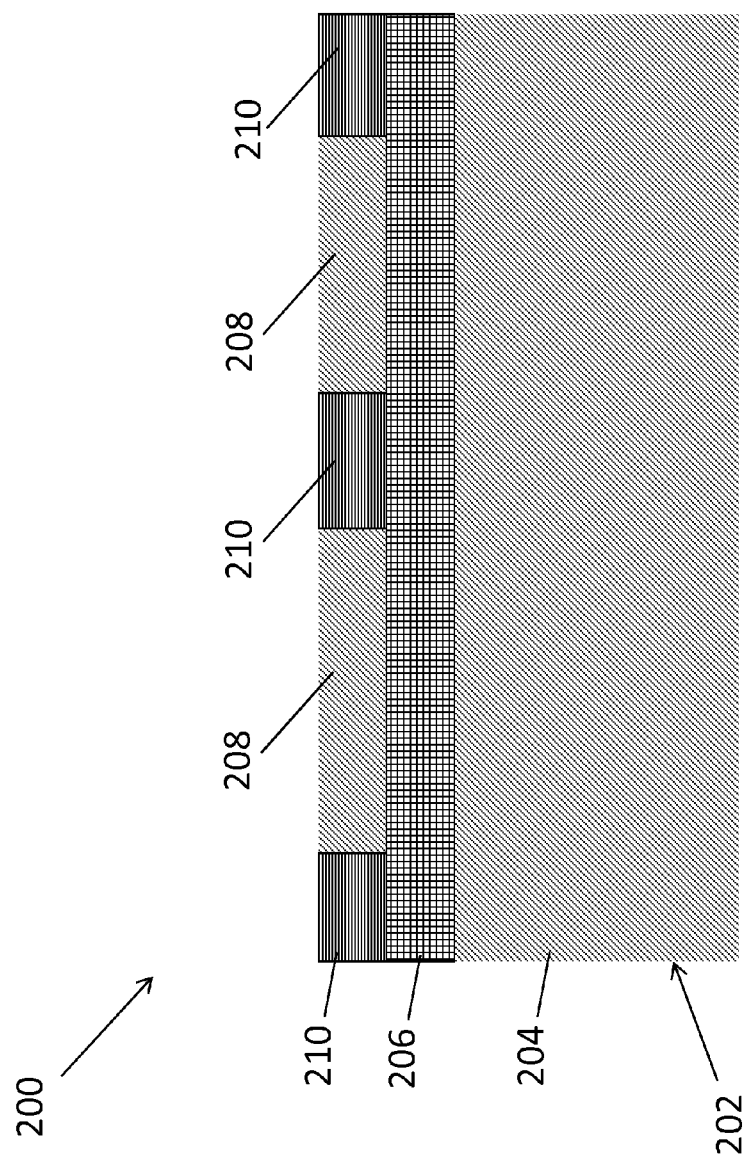

Turning now to FIGS. 2-10, a series of diagrams illustrate a process flow of fabricating a PUF semiconductor device 200 according to a non-limiting embodiment. Referring to FIG. 2, a semiconductor-on-insulator (SOI) starting substrate 202 is illustrated. Although a SOI starting substrate 202 is illustrated, it should be appreciated that a conventional bulk semiconductor substrate may be used without departing from the scope of the invention. The SOI substrate 202 includes a bulk substrate layer 204, a buried insulator layer 206 formed on an upper surface of the bulk substrate layer 204, and one or more active semiconductor layers 208a-208b formed on an upper surface of the buried insulator layer 206. The bulk semiconductor layer 204 comprises, for example, silicon (Si). The buried insulator layer 206 comprises, for example, silicon oxide (SiO₂). The active semiconductor layers 208a-208b comprise, for example, Si. The SOI substrate 202 further includes one or more shallow trench isolation (STI) regions 210 that electrically isolate the active semiconductor layers 208a-208b from each other. The STI regions 210 comprise, for example, SiO₂.

Figure 3:
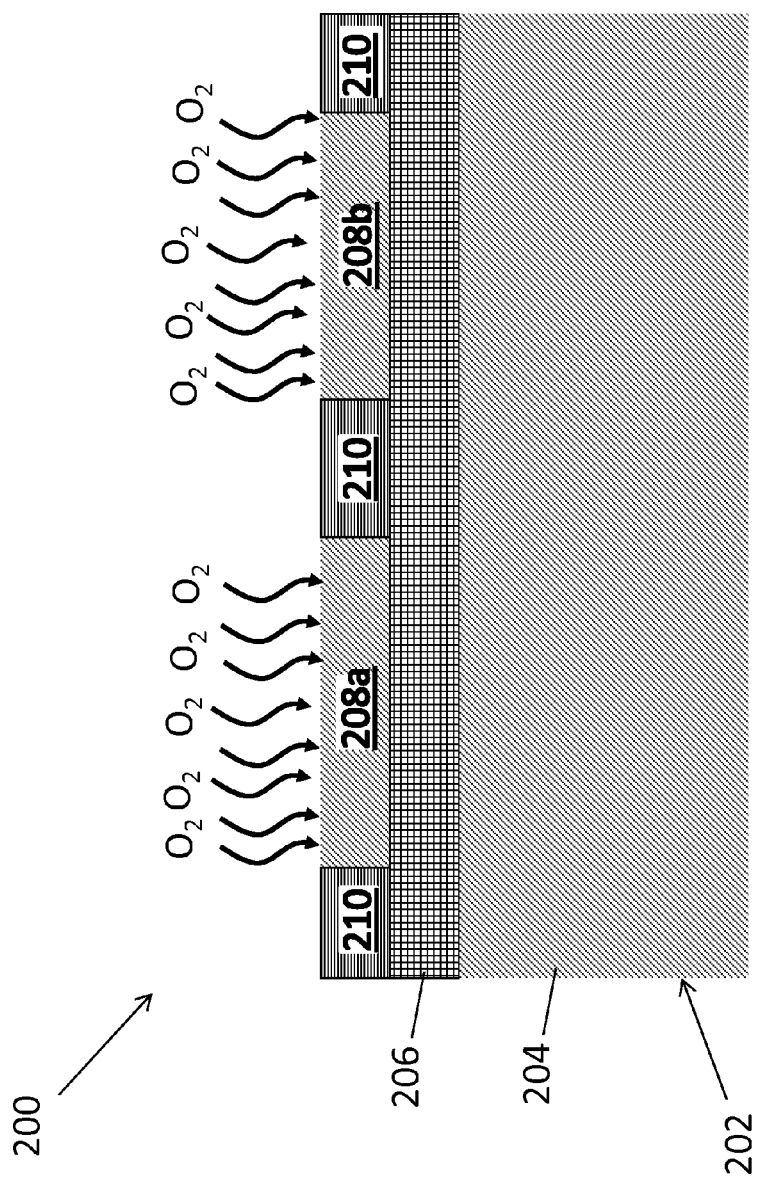

Referring now to FIG. 3, the SOI substrate 202 is illustrated undergoing an oxidation process as understood by one of ordinary skill in the art. The oxidation process includes, for example, a thermal oxidation process. In addition, the oxidation process can include a dry oxidation process which exposes the SOI substrate 202, and in particular the active semiconductor layers 208a-208b (i.e., active Si) to molecular oxygen ions (O₂) at high temperatures ranging, for example, from approximately 800 degrees Celsius (° C.) to approximately 1200° C. Although O₂ ions are descried, it should be appreciated that other ions may be used to form a second dielectric layer portion comprising a different material than the initial gate dielectric layers 212a-212b formed according to the first oxidation process. It should also be appreciated that the dry thermal oxidation process can be replaced with a wet thermal oxidation process, which exposes the active semiconductor layers 208a-208b to water vapor such as, for example, ultra-high purity (UHP) steam.

Figure 4:
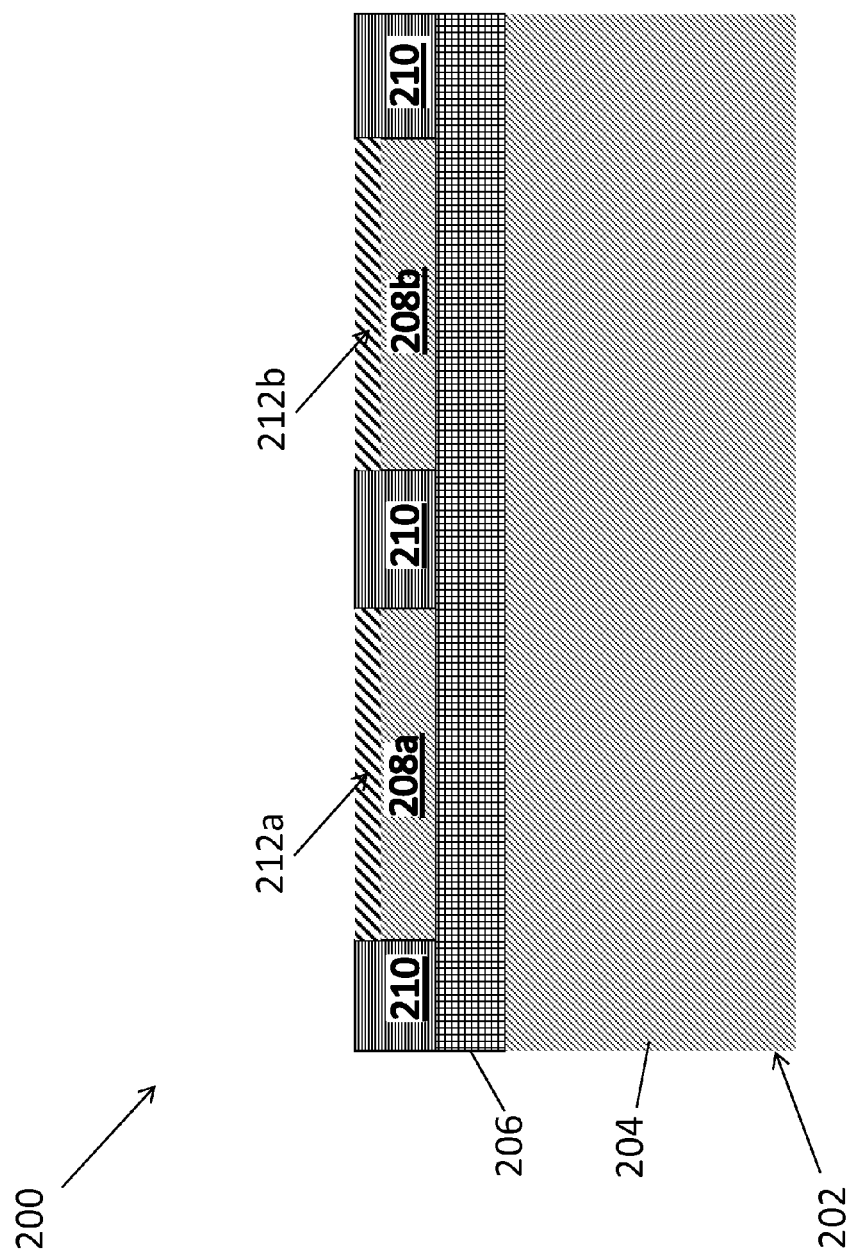

Turning to FIG. 4, the SOI substrate 202 is illustrated including dielectric gate layers 212a-212b embedded in an upper portion of each active semiconductor layer 208a-208b as a result of the preceding thermal oxidation process. In this manner, each active semiconductor layer 208a-208b is interposed between a respective gate dielectric layer 212a-212b and the buried insulator layer 206. The gate dielectric layers 212a-212b comprise SiO2, and can be utilized as gate dielectric layers, as discussed in greater detail below. The depth of the gate dielectric layers 212a-212b can be controlled based on the time at which the SOI substrate 202 is exposed to the preceding thermal oxidation process. According to a non-limiting embodiment the gate dielectric layers 212a-212b can have an initial depth ranging, for example, from approximately 2 nm to approximately 10 nm.

Figure 5:
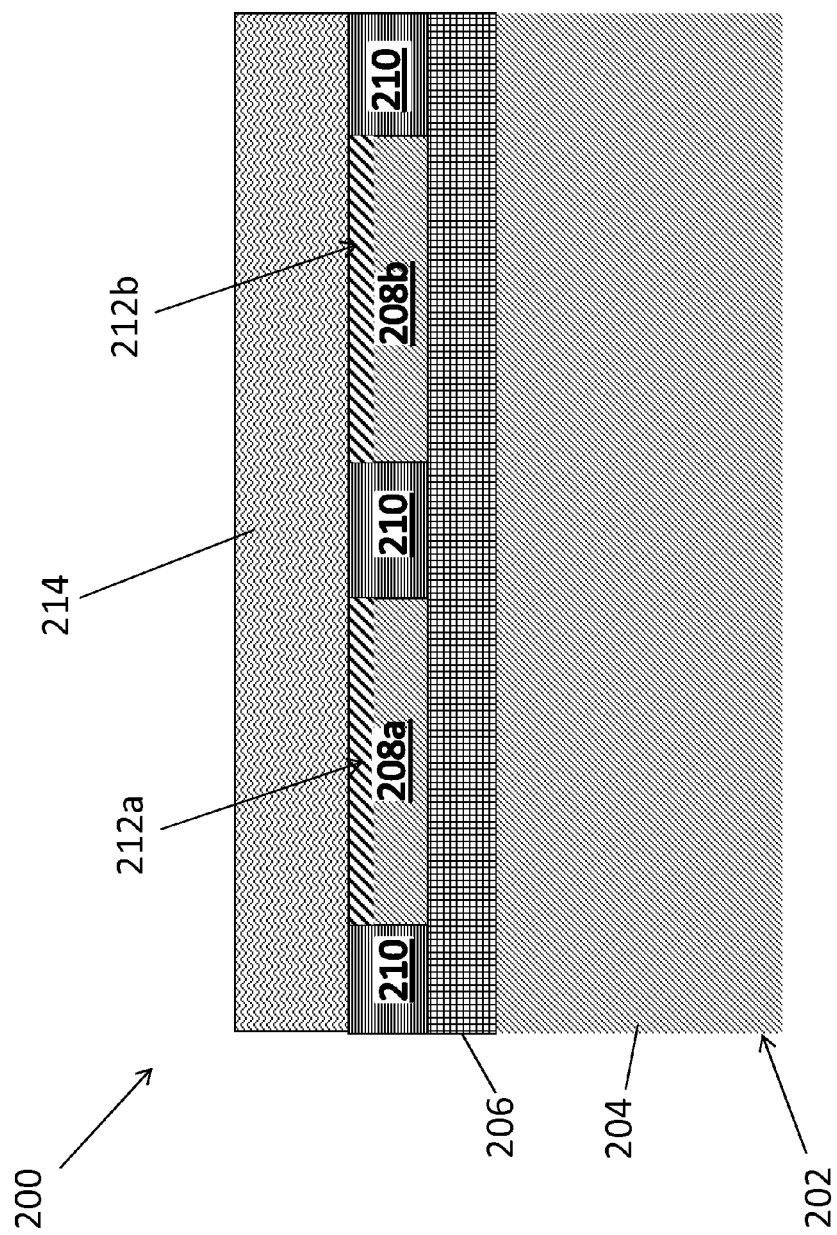

Referring now to FIG. 5, a block photoresist layer 214 is deposited directly on an upper surface of the SOI substrate 202, which completely covers the STI layers 210 and the gate dielectric layers 212a-212b. The block photoresist layer 214 comprises, for example, an organic light-sensitive material as understood by one of ordinary skill in the art which can be deposited on the upper surface of the SOI substrate using various deposition methods including, for example, spin coating.

Figure 6:
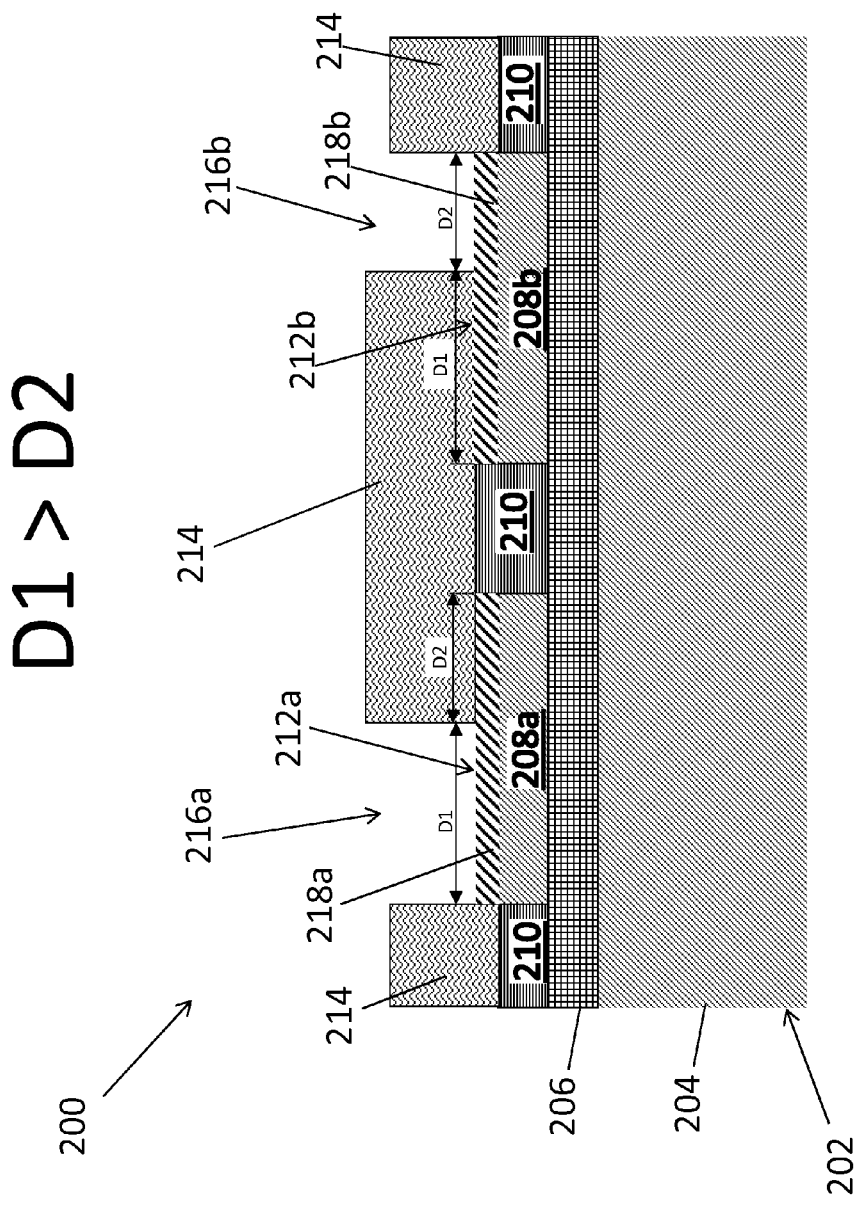

Referring to FIG. 6, the photoresist layer 214 is patterned to form one or more openings 216a-216b therein which exposes dielectric portions 218a-218b of the underlying gate dielectric layer 212a-212b, respectively. The patterning process includes interposing a photomask (not shown) between the photoresist layer 214 and a light source such as, for example, an ultra violet (UV) light source. The photomask includes openings formed therethrough. In this manner, solid portions of the photomask block a first portion of the UV light, while a second portion of the UV light passes through the mask openings and reaches the photoresist layer 214. The UV light reacts with a portion of the photoresist layer 214 such that the openings 216a-216b are formed therein. The size of the openings 216a-216b is randomly varied with respect to each other due to the UV light exposure. According to a non-limiting embodiment, a first opening 216a has a first size (D1) and the a second opening 216b has a second size (D2) that is less than D1, as further shown in FIG. 6. In this manner, a dielectric layer portion 218a exposed via the first opening 216a has a larger area than the opposing dielectric layer portion 218b exposed via the second opening 216b. That is, a single blocking litho/resist covers a first dielectric layer portion 218b more than a second dielectric layer portion 218a.

Figure 7:
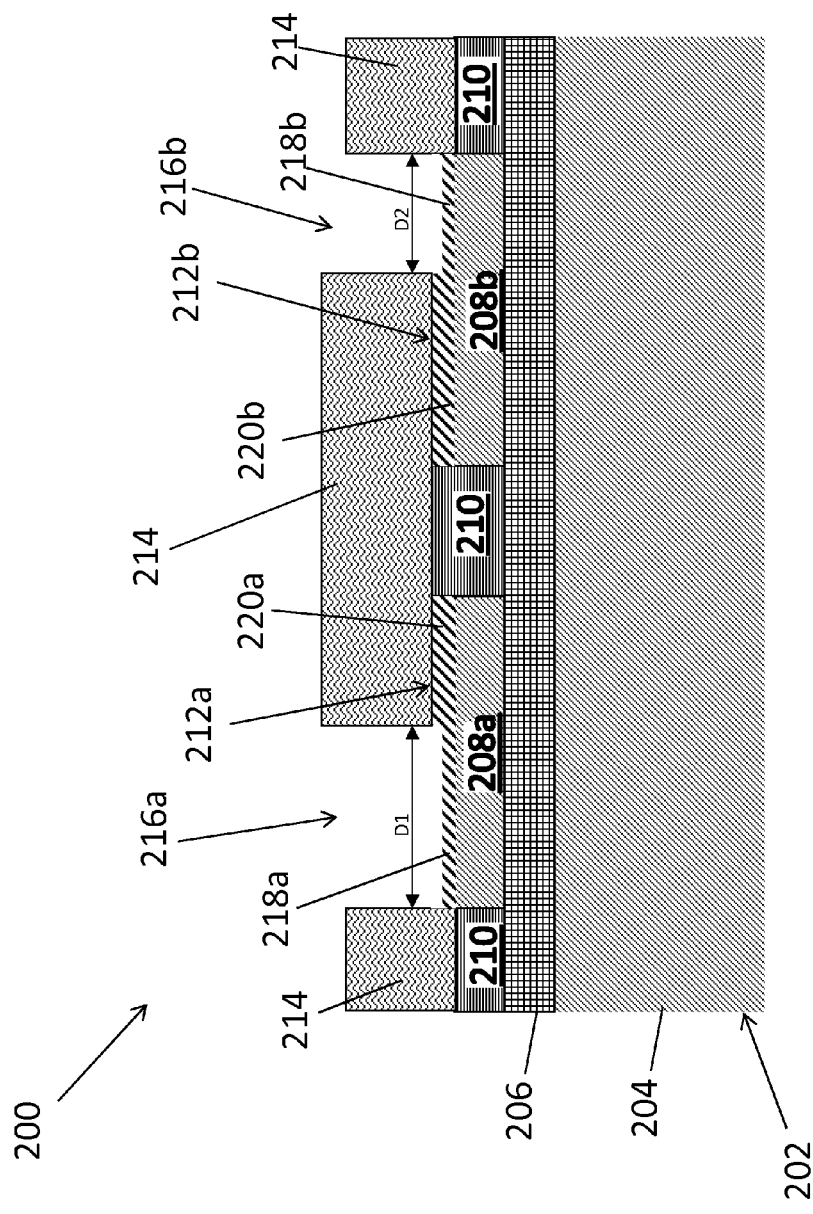

Turning to FIG. 7, the exposed dielectric layer portion 218a and the opposing exposed dielectric layer portion 218b are recessed below respective remaining portions 220a-220b of the gate dielectric layer 212a-212b that are covered by the remaining photoresist layer 214. Various etching techniques may be implemented to etch the exposed dielectric layer portion 218a and the exposed dielectric layer portion 218b including, for example, a hydrofluoric (HF) etchant. According to a non-limiting embodiment, the exposed dielectric layer portion 218a and the opposing exposed dielectric layer portion 218b can be recessed to have a thickness ranging from, for example, approximately 0.5 nm to approximately 3 nm.

Figure 8:
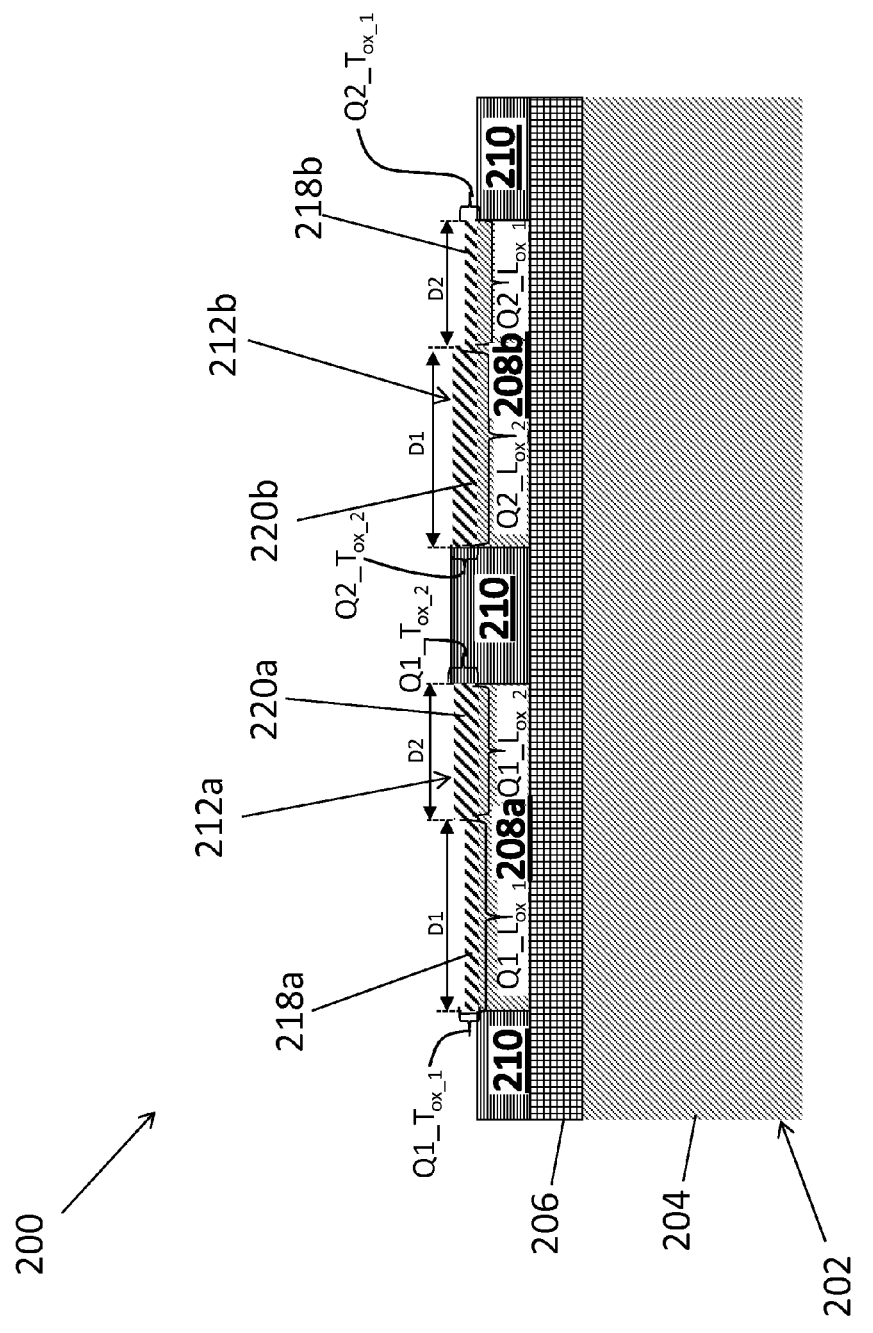

With reference now to FIG. 8, the remaining photoresist layer 214 is removed from the upper surface of the PUF semiconductor device 200. At this stage, the upper surface of the PUF semiconductor device 200 includes a first gate dielectric layer 212a and a second gate dielectric layer 212b which are asymmetrical with respect one another as discussed in greater detail below. The first gate dielectric layer 212a has a respective first dielectric layer portion 218a and second dielectric layer portion 220a (i.e., remaining portion 220a). The first dielectric layer portion 218a and the second dielectric layer 220a define a left dielectric layer portion 218a and a right dielectric layer portion 220b having different dimensions with respect to one another.

Similarly, the second gate dielectric layer 212b has a respective first dielectric layer portion 218b and second dielectric layer portion 220b (i.e., remaining portion 220b). The first dielectric layer portion 218b and the second dielectric layer portion 220b of the second define a left dielectric layer portion 218b and a right dielectric layer portion 220b having different dimensions with respect to one another.

The first dielectric layer portion 218a of the first gate dielectric layer 212a has a first dielectric thickness (Q1_Tox_1) and a first dielectric length (Q1_Lox_1). The first dielectric thickness (Q1_Tox_1) and the first dielectric length (Q1_Lox_1) define a first dielectric area of the first dielectric layer portion 218a. The second dielectric layer portion 220a of the first gate dielectric layer 212a has a second dielectric thickness (Q1_Tox_2) and a second dielectric length (Q1_Lox_2). The second dielectric thickness (Q1_Tox_2) and the second dielectric length (Q1_Lox_2) define a second dielectric area of the second dielectric layer portion 220a.

The dimensions of the first dielectric layer portion 218a are different from the dimensions of the second dielectric layer portion 220a. According to a non-limiting embodiment, the dielectric thickness (Q1_Tox_1) of the first dielectric layer portion 218a is less than (i.e., thinner) than the dielectric thickness (Q1_Tox_2) of the second dielectric layer portion 220a. In addition, the dielectric length (Q1_Lox_1) of the first dielectric layer portion 218a is greater than the dielectric length (Q1_Lox_2) of the second dielectric layer portion 220a.

Still referring to the non-limiting embodiment illustrated in FIG. 8, the first dielectric layer portion 218b of the second gate dielectric layer 212b has a first dielectric thickness (Q2_Tox_1) and a first dielectric length (Q2_Lox_1). The first dielectric thickness (Q2_Tox_1) and the first dielectric length (Q2_Lox_1) define a first dielectric area of the first dielectric layer portion 218b. The second dielectric layer portion 220b of the second gate dielectric layer 212b has a second dielectric thickness (Q2_Tox_2) and a second dielectric length (Q2_Lox_2). The second dielectric thickness (Q2_Tox_2) and the second dielectric length (Q2_Lox_2) define a second dielectric area of the second dielectric layer portion 220b.

Similar to the first gate dielectric layer 212a, the second gate dielectric layer 212b includes a first dielectric layer portion 218b that has different dimensions than the second dielectric layer portion 220b. According to a non-limiting embodiment, the dielectric thickness (Q2_Tox_1) of the first dielectric layer portion 218b is less than (i.e., thinner) than the dielectric thickness (Q2_Tox_2) of the second dielectric layer portion 220b. However, the dielectric length (Q2_Lox_1) of the first dielectric layer portion 218b is less than the dielectric length (Q2_Lox_2) of the second dielectric layer portion 220b. Accordingly, the overall second dielectric area of the second gate dielectric layer 212b is greater than the overall first dielectric area of the first gate dielectric layer 212a.

As further illustrated in FIG. 8, the first gate dielectric layer 212a and the second gate dielectric layer 212b are fabricated in reverse with respect to one another. For example, The first gate dielectric layer 212a has a first dielectric layer portion 218a, i.e., a left dielectric layer portion 218a, with a length (D1) and second dielectric layer portion 220a, i.e., a right dielectric layer portion 220a, with a length (D2). The second gate dielectric layer 212b, however, has a first dielectric layer portion 218b, i.e., a right dielectric layer portion 218b, with a length (D2) and a second dielectric layer portion 220b, i.e., a left dielectric portion 220b, with a length (D1). That is, the length (D1) of the left dielectric layer portion 218a corresponding to the first gate dielectric layer 212a matches the length (D1) of the left dielectric layer portion 220b corresponding to the second gate dielectric layer 212b. However, the thickness the left dielectric layer portion 218a corresponding to the first gate dielectric layer 212a is less than, for example, the thickness of the left dielectric layer portion 220b corresponding to the second gate dielectric layer 212b.

Similarly, the length (D2) of the right dielectric layer portion 220a corresponding to the first gate dielectric layer 212a matches the length (D2) of the right dielectric layer portion 218b corresponding to the second gate dielectric layer 212b. However, the thickness the right dielectric layer portion 220a corresponding to the first gate dielectric layer 212a is greater than, for example, the thickness of the right dielectric layer portion 218b corresponding to the second gate dielectric layer 212b. Accordingly, the second dielectric gate layer 212b is fabricated in reverse with respect to the first gate dielectric layer 212a. It should be appreciated that the dimensions of the first and second gate dielectric layers 212a-212b are not limiting. For example, the thickness of the left dielectric layer portion 218a corresponding to the first gate dielectric layer 212a can be greater than the thickness of the left dielectric layer portion 220b corresponding to the second gate dielectric layer 212b, and the thickness of the right dielectric layer portion 220a corresponding to the first gate dielectric layer 212a can be less than the thickness of the right dielectric layer portion 218b corresponding to the second gate dielectric layer 212b.

Figure 9:
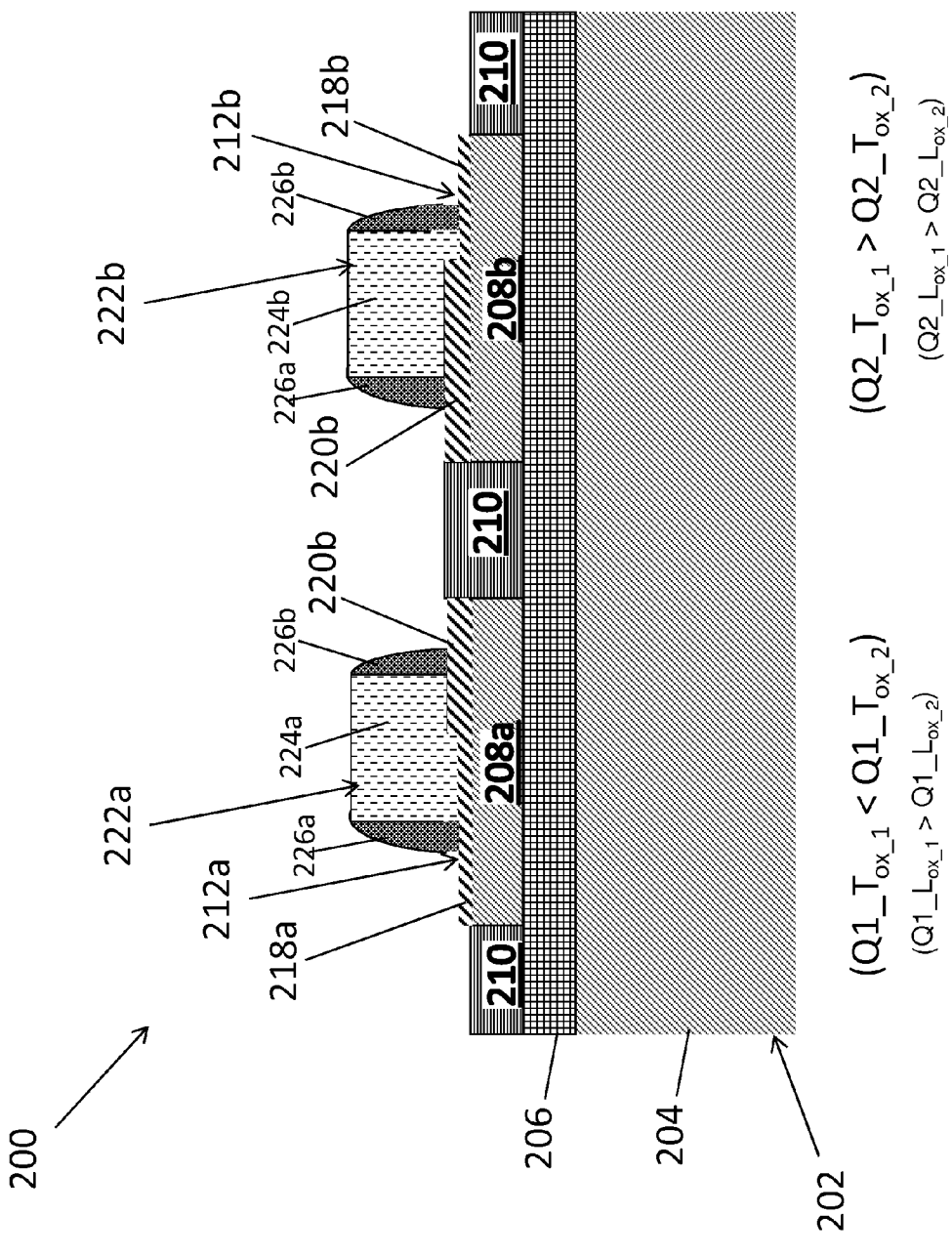
FIG. 9 illustrates the substrate of FIG. 8 following formation of a first gate structure on the first oxide layer and a second gate structure on the second oxide layer.

Turning now to FIG. 9, a first gate structure 222a is formed on the first gate dielectric layer 212a and a second gate structure 222b is formed on the second gate dielectric layer 212b. Each of the first and second gate structures 222a-222b include an electrode region 224a-224b comprising a dummy gate or metal gate as understood by one of ordinary skill in the art. The gate structures 222a-222b also include spacers 226a-226b formed on the sidewalls of a respective electrode region 224a-224b. The spacers 226a-226b can comprise various materials including, but not limited to, silicon nitride (SiN).

The first gate structure 222a is formed on the first gate dielectric layer 212a such that the first electrode region 224a is disposed on a portion of the first dielectric layer portion 218a and a portion of the second dielectric layer portion 220a. In a similar manner, the second gate structure 222b is formed on the second gate dielectric layer 212b such that the second electrode region 224b is disposed on a portion of the first dielectric layer portion 218b and a portion of the second dielectric layer portion 220b. In a similar fashion, the second gate structure 222b is formed on the second gate dielectric layer 212b such that the second gate region 224b is disposed partially on the first dielectric layer portion 218b and partially on the second dielectric layer portion 220b. Since, however, the overall second dielectric area (e.g., the overall dielectric thickness) of the second gate dielectric layer 212b is greater (i.e., portion 220b is thicker than portion 218b) than the overall first dielectric area (e.g., the overall oxide thickness) of the first gate dielectric layer 212a (i.e., portion 218a is thinner than portion 220b), the second gate structure 222b has a threshold voltage (Q2_Vt) that is greater than the threshold voltage (Q1_Vt) of the first gate structure 222a. In other words, the voltage required to switch on the first gate structure 222a is less than the voltage required to switch on the second gate structure 222b because the overall first dielectric area (e.g., the overall oxide thickness) formed beneath the first gate electrode region 224a is less than the overall second dielectric area (e.g., the overall oxide thickness) formed beneath the second gate electrode region 224b.

Figure 10:
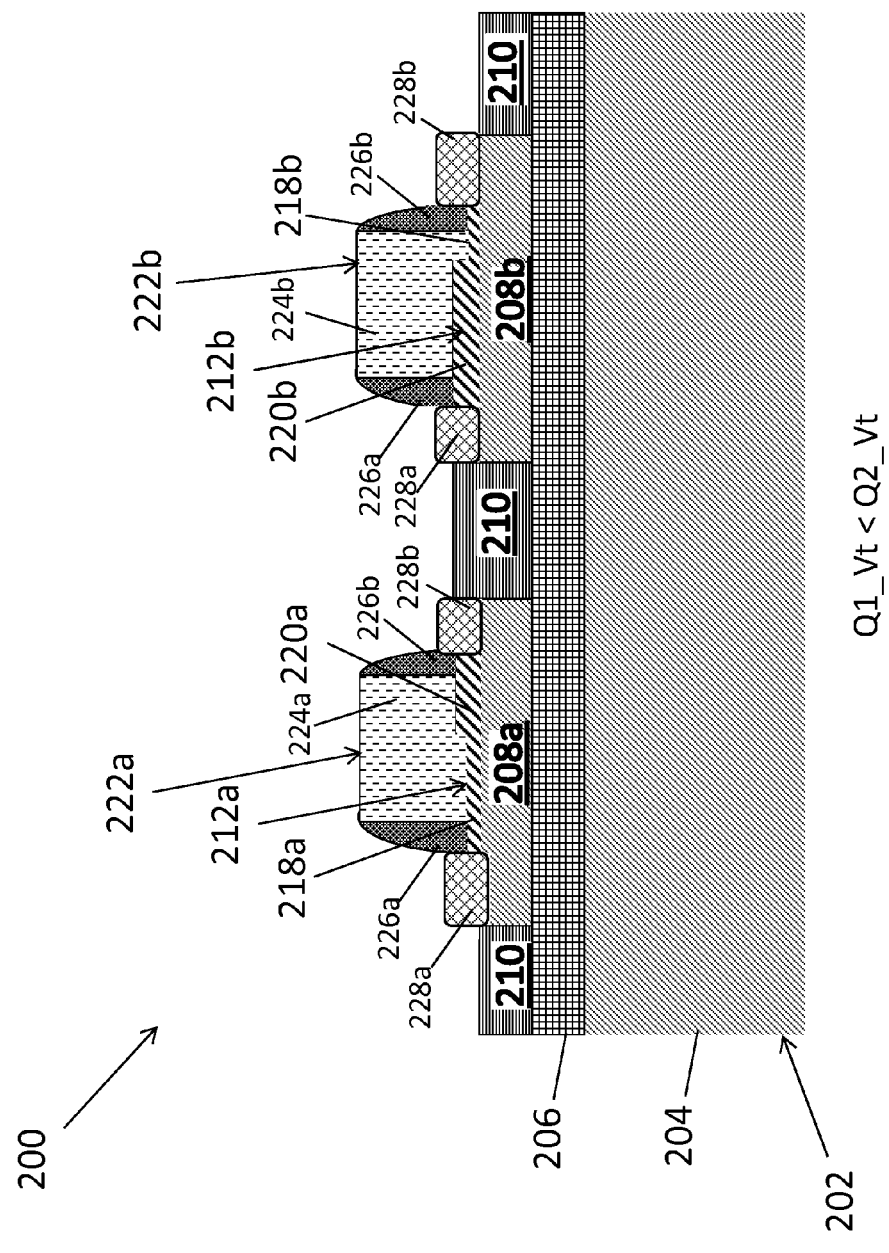
FIG. 10 illustrates a substrate of FIG. 9 after etching portions of the first and second oxide layers to expose source/drain regions on the active semiconductor layers and after forming source/drain elements on respective source/drain regions to form a PUF semiconductor device that introduces a random variation in threshold voltages of a first gate structure and a second gate structure.

Referring now to FIG. 10, portions of the first gate dielectric layer 212a and the second gate dielectric layer 212b are removed from locations corresponding to source/drain regions of the active semiconductor layers 208a-208b, respectively. Source/drain elements 228a-228b are then formed on the source/drain regions (i.e., the exposed active semiconductor layers 208a-208b) using various techniques including, for example, epitaxy crystalline growth, as understood by one of ordinary skill in the art. Accordingly, a PUF semiconductor device 200 including a pair of semiconductor structures (e.g., transistors). Each semiconductor structure includes a gate structures 222a-222b, respectively, having a randomly created threshold voltage (Q1_Vt, Q2_Vt) due to the random size variation of the first and second gate dielectric layers 212a-212b formed according to the process flow described in detail above.

For example, dielectric layer portion 218a of the first gate dielectric layer 212a is located at a first region (e.g., a left region) of the first semiconductor structure and dielectric layer portion 220b of the first gate dielectric layer 212a is located at a second region (e.g., right region) of the first semiconductor structure. Similarity, dielectric layer portion 220b of the second gate dielectric layer 212b is located at a first region (e.g., left region) of the second semiconductor structure matching the first region (e.g., left region) of the first semiconductor structure, and dielectric layer portion 218b of the second gate dielectric layer 212b is located at a second region (e.g., right region) of the second semiconductor structure matching the second region (e.g., right region) of the first semiconductor structure. In this manner, the thickness of the dielectric layer portions located at matching regions of the first and second semiconductor structures can be formed differently. For instance, a thickness of the dielectric layer portion 218a located at the first region of the first semiconductor structure is different than the thickness of dielectric layer portion 220b located at the first region of the second semiconductor structure.

A voltage differential between the first threshold voltage (Q1_Vt) and the second voltage threshold (Q2_Vt) can be determined using, for example, a microcontroller (not shown in FIG. 10) as discussed in greater detail below. The microcontroller can further compare the voltage differential to a threshold value to determine either a "0" bit or "1" bit corresponding to the particular PUF semiconductor device 200. For example, if the voltage differential is below the threshold value, the microcontroller assigns a "0" bit output to the PUF semiconductor device 200. If, however, the voltage differential is greater than or equal to the threshold value, the microcontroller assigns a "1" bit output to the PUF semiconductor device 200. Since the voltage differential is based on the random sizing of the first gate dielectric layer 212a and second gate dielectric layer 212b, the bit output assigned to the PUF semiconductor device 200 (i.e., the pair of gate structure 222a-222b) is also random.

Accordingly, at least one embodiment provides a PUF semiconductor device 200 that introduces a random variation in the threshold voltage (Vt) between a pair of semiconductor structures which is easy to evaluate but difficult to predict, and practically impossible to recreate. According to a non-limiting embodiment, an offset of threshold voltage from each pair of semiconductor structures (e.g., transistors) above is self-enhanced, i.e., with one semiconductor structure having a lower Vt, while the other semiconductor structure necessarily has a higher Vt. Moreover, since the random variation in Vt is based on the random sizing of the gate dielectric layers, the random variation can be achieved using a standard semiconductor fabrication process flow without introducing additional PUF fabrication processes. As a result, the overall costs to fabricate the PUF semiconductor device 200 are reduced.

Figure 11:
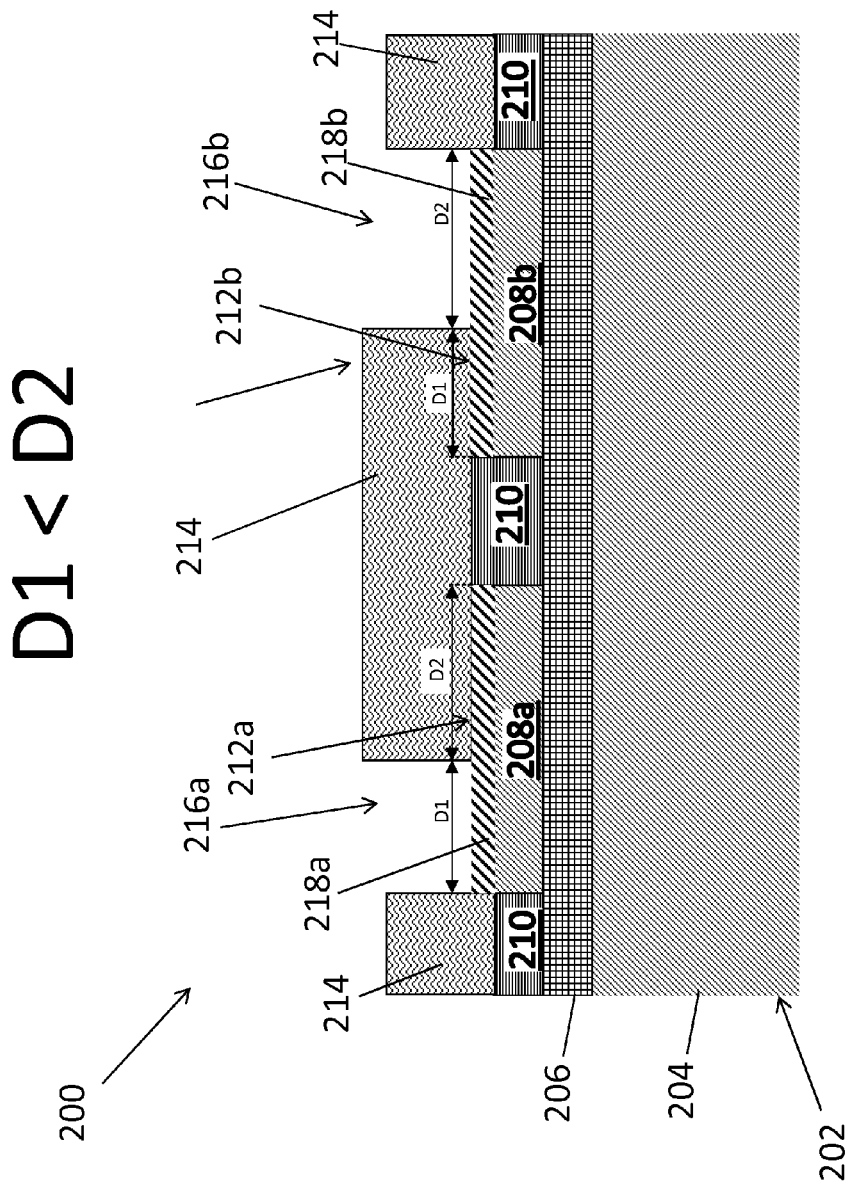

Turning now to FIGS. 11-17, a series of diagrams illustrating a process flow of fabricating a PUF semiconductor device 200 having a random variation in gate lengths according to another non-limiting embodiment. With reference to FIG. 11, an SOI substrate 202 is illustrated following a photolithography process that patterns openings 216a-216b in a photoresist layer 214 to exposes portions 218a-218b of an initial gate dielectric layer 212a-212b, respectively, which are formed according to a first oxidation process. As described in detail above, the patterning process includes interposing a photomask (not shown) between the photoresist layer 214 and a light source such as, for example, an ultra violet (UV) light source. The photomask includes pattern openings formed therethrough such that solid portions of the photomask block a first portion of the UV light, while the pattern openings allow a second portion of the UV light to reach the photoresist layer 214. The UV light reacts with a portion of the photoresist layer 214 such that the openings 216a-216b are formed therein. The size of the openings 216a-216b is randomly varied with respect to each other due to the UV light exposure. According to a non-limiting embodiment, a first opening 216a has a first size (D1) and the a second opening 216b has a second size (D2) that is greater than D1, as further shown in FIG. 11. In this manner, the area of the exposed dielectric layer portion 218a is smaller than the area of the opposing exposed dielectric layer portion 218b.

Figure 12:
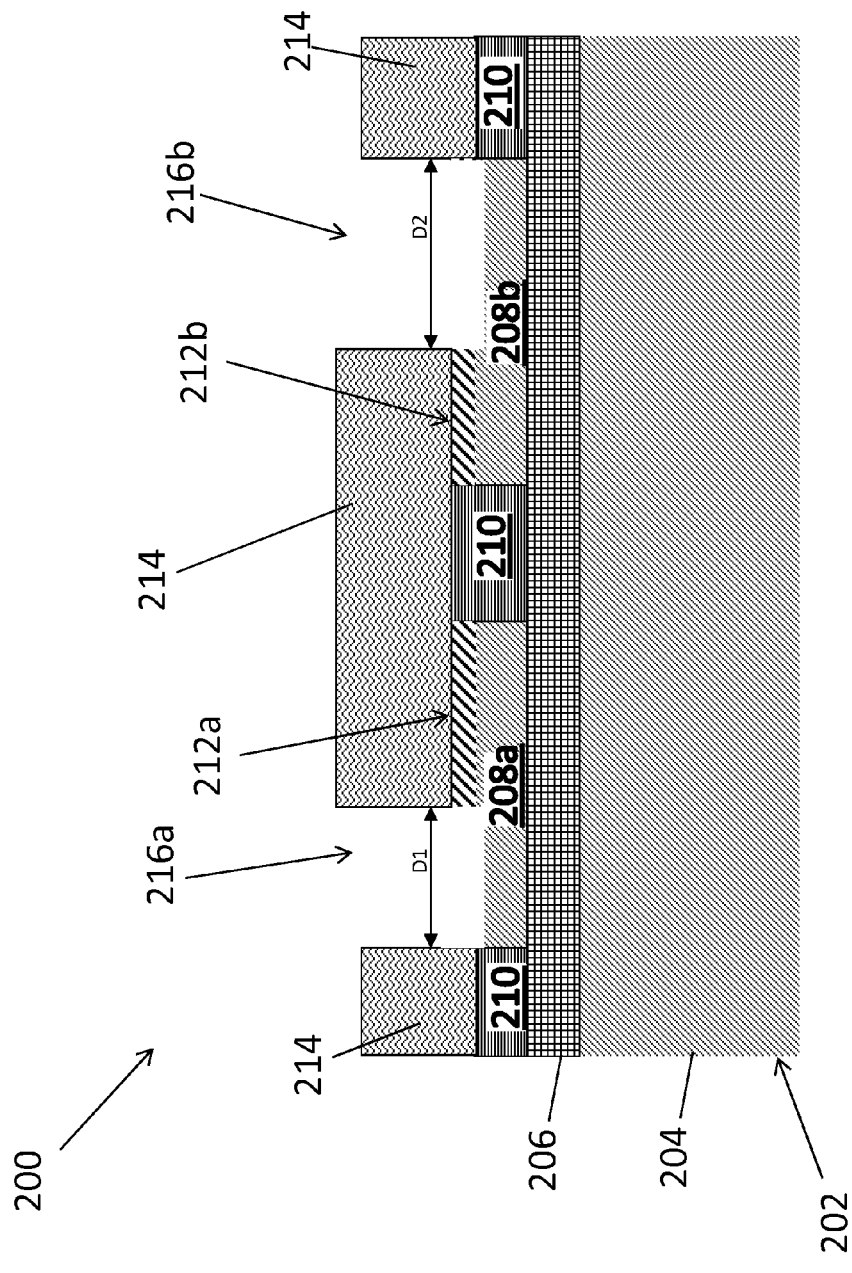

FIG. 12 illustrates the SOI substrate 202 of FIG. 11 after completely recessing the previously exposed dielectric layer portions 218a-218b to partially expose each of the underlying first active semiconductor layer 208a and the underlying second semiconductor layer 208b. Various etching techniques may be implemented to etch the exposed dielectric layer portions 218a-218b including, for example, an HF etchant. Since the size of the first opening 216a is smaller than the size of the second opening 216b, the area of the first exposed active semiconductor layer 208a is smaller than the area of the second exposed active semiconductor layer 208b.

Figure 13:
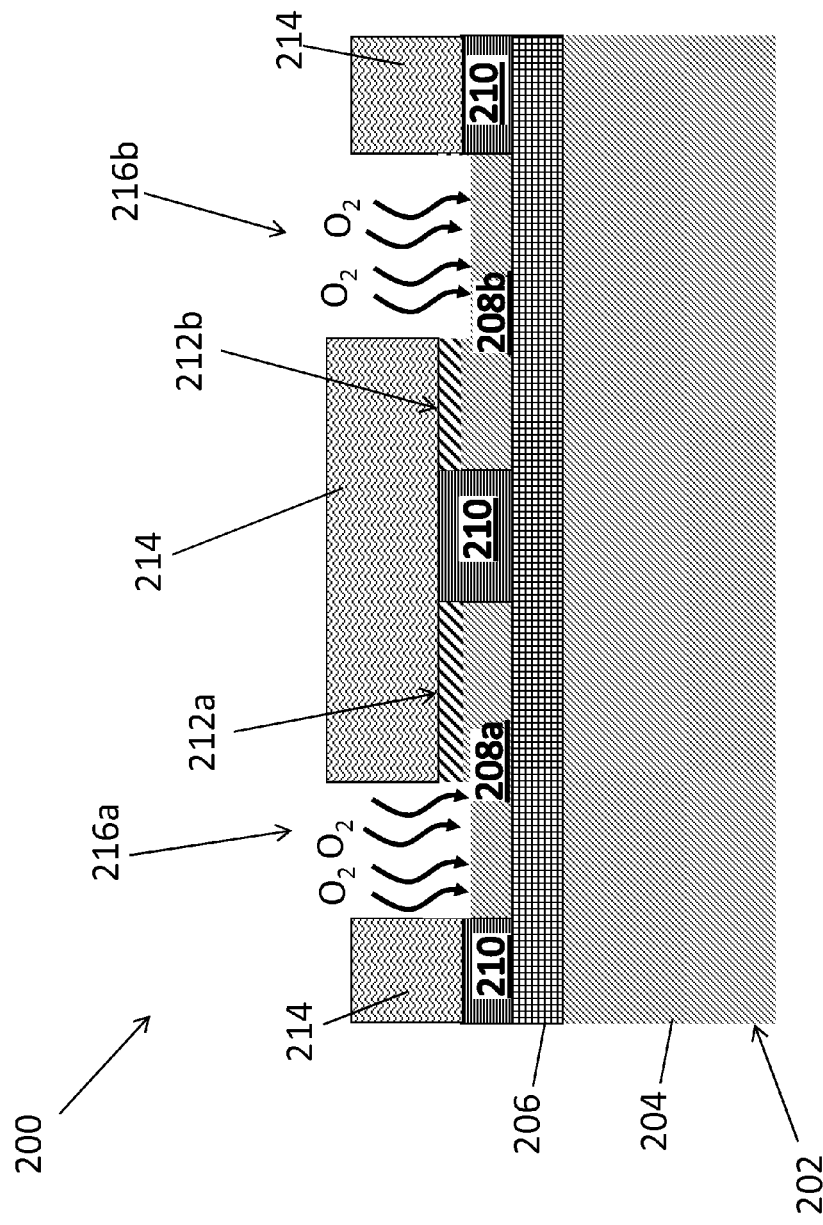

Referring now to FIG. 13, the SOI substrate 202 is illustrated undergoing a second oxidation process. The second oxidation process is essentially applied to the entire SOI substrate 202. However, only the exposed portions of the first active semiconductor layer 208a and the second active semiconductor layer 208b react to the second oxidation process. The second oxidation process can be similar to the first oxidation process used to form the initial gate dielectric layers 212a-212b. For example, the second oxidation process can be a dry thermal oxidation process which exposes the SOI substrate 202, and in particular the exposed active semiconductor layers 208a-208b (i.e., active Si), to molecular oxygen ions ($O_2$) at high temperature. The high temperature can range, for example, from approximately 800 degrees Celsius (° C.) to approximately 1200° C. Although $O_2$ ions are descried, it should be appreciated that other ions may be used to form a second dielectric layer portion comprising a different material than the initial gate dielectric layers 212a-212b formed according to the first oxidation process. It should also be appreciated that the dry thermal oxidation process can be replaced with a wet thermal oxidation process, which exposes the active semiconductor layers 208a-208b to water vapor such as, for example, ultra-high purity (UHP) steam.

Figure 14:
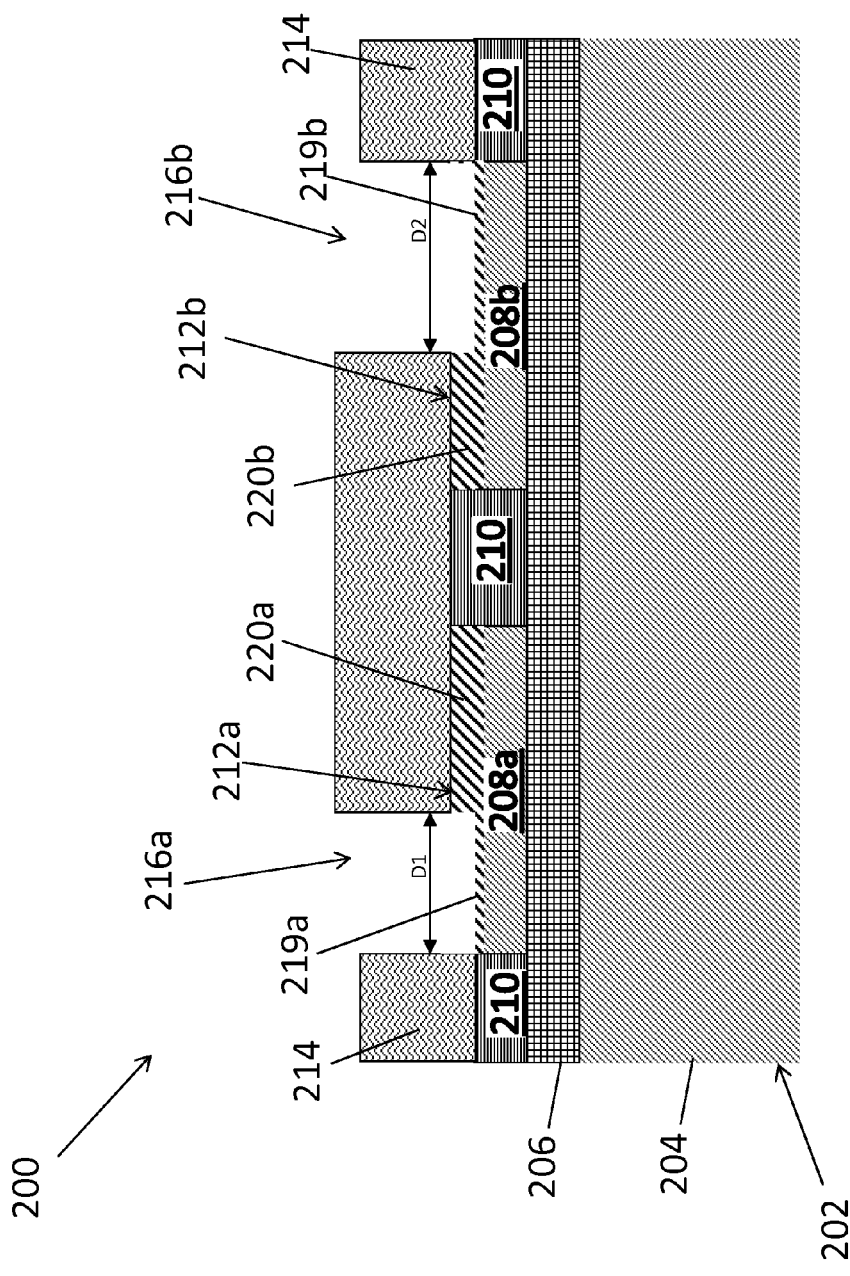

Referring to FIG. 14, the SOI substrate 202 is illustrated following the aforementioned second oxidation process. As a result of the second oxidation process, second dielectric layer portions 219a-219b are formed from the exposed active semiconductor layers 208a-208b, respectively. The second dielectric 219a layer portion, e.g., the left dielectric layer 219a layer portion, of the first gate dielectric layer 212a has a different length and a different thickness than the first dielectric layer portion 220a, e.g., the right dielectric layer portion 220b of the first gate dielectric layer 212a. Similarly, the second dielectric layer portion 219b, e.g., the right dielectric layer portion layer 219b, of the second gate dielectric layer 212b has a different length and a different thickness than the first dielectric layer portion 220b, e.g., the left dielectric layer portion 220b of the second gate dielectric layer 212b. Accordingly, the resulting first gate dielectric layer 212a and resulting second gate dielectric layer 212b are fabricated in reverse and are asymmetrical with respect to one another. Although the second dielectric layer portions 219a-219b are shown as having first thickness that is less than the thickness of the remaining dielectric portions 220a-220b, it is possible that the second oxidation process could be used to form second dielectric layer portions 219a-219b having a thickness that is greater than the thickness of the remaining dielectric portions 220a-220b.

Figure 15:
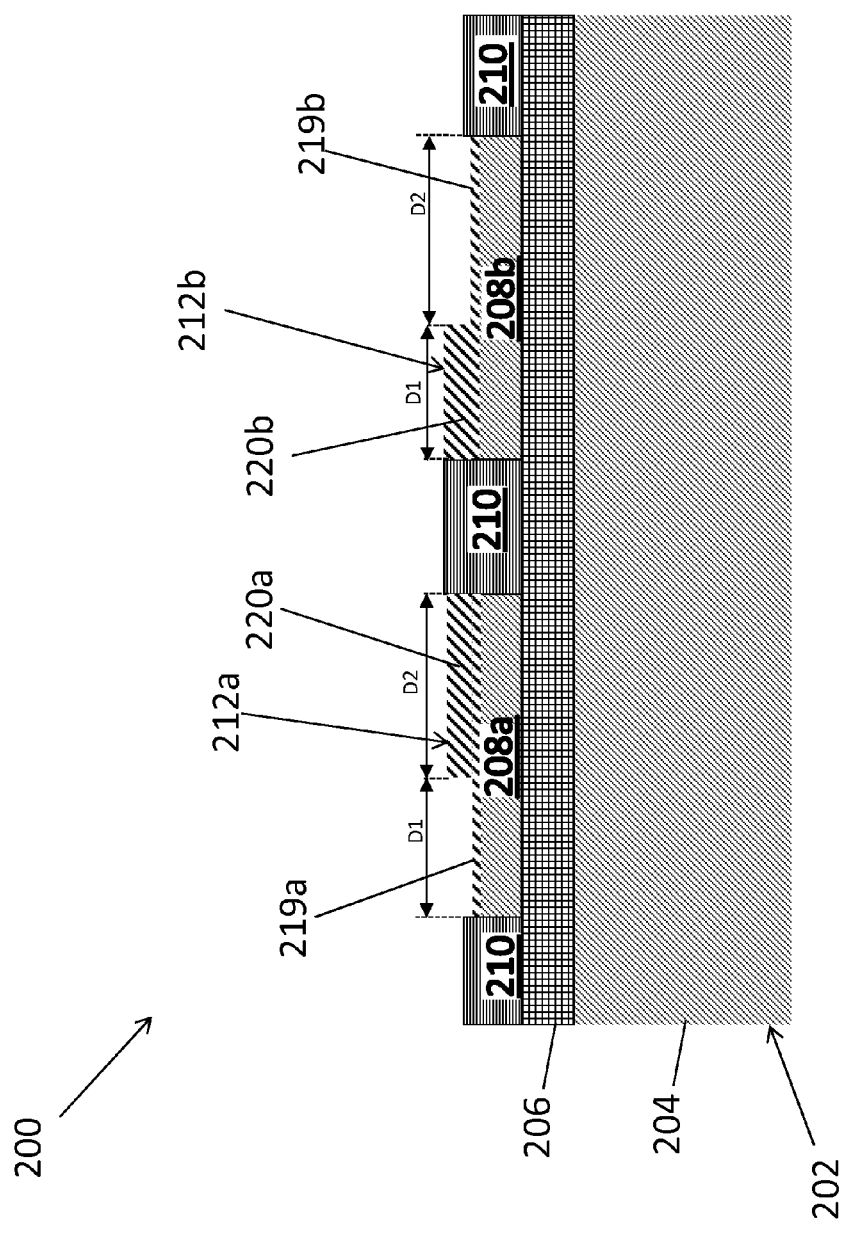

FIG. 15 illustrates the substrate of FIG. 14 after removing the remaining photoresist layer to expose an upper surface of including a first gate dielectric layer 212a having a second dielectric layer portion 219a that is thinner than the remaining dielectric layer portion 220a, and a second gate dielectric layer 212b having a second dielectric layer portion 219b that is thinner than the remaining dielectric layer portion 220b. For example, the first dielectric layer portion 219a of the first gate dielectric layer 212a has a first dielectric thickness (Q1_Tox_1) and a first dielectric length (Q1_Lox_1). The first dielectric thickness (Q1_Tox_1) and the first dielectric length (Q1_Lox_1) define a first dielectric area of the first dielectric layer portion 219a. The second dielectric layer portion 220a of the first gate dielectric layer 212a has a second dielectric thickness (Q1_Tox_2) and a second dielectric length (Q1_Lox_2). The second dielectric thickness (Q1_Tox_2) and the second dielectric length (Q1_Lox_2) define a second dielectric area of the second dielectric layer portion 220a.

As further illustrated in FIG. 15, the dimensions of the first dielectric layer portion 219a are different from the dimensions of the second dielectric layer portion 220a. For example, the dielectric thickness (Q1_Tox_1) of the dielectric layer portion 219a is less than (i.e., thinner) than the dielectric thickness (Q1_Tox_2) of the remaining dielectric layer portion 220a. In addition, the dielectric length (Q1_Lox_1) of the dielectric layer portion 219a is less than the dielectric length (Q1_Lox_2) of the remaining dielectric layer portion 220a.

Still referring to the non-limiting embodiment illustrated in FIG. 15, the dielectric layer portion 219b of the second gate dielectric layer 212b has a first dielectric thickness (Q2_Tox_1) and a first dielectric length (Q2_Lox_1). The first dielectric thickness (Q2_Tox_1) and the first dielectric length (Q2_Lox_1) define a first dielectric area of the dielectric portion layer 219b. The remaining dielectric layer portion 220b of the second gate dielectric layer 212b has a second dielectric thickness (Q2_Tox_2) and a second dielectric length (Q2_Lox_2). The second dielectric thickness (Q2_Tox_2) and the second dielectric length (Q2_Lox_2) define a second dielectric area of the remaining dielectric portion layer portion 220b.

Similar to the first gate dielectric layer 212a, the second gate dielectric layer 212b includes a dielectric layer portion 219b that has different dimensions than the remaining dielectric layer portion 220b. According to a non-limiting embodiment, the dielectric thickness (Q2_Tox_1) of the dielectric layer portion 219b is less than (i.e., thinner) than the dielectric thickness (Q2_Tox_2) of the remaining dielectric layer portion 220b. However, the dielectric length (Q2_Lox_1) of the dielectric layer portion 219b is greater than the dielectric length (Q2_Lox_2) of the remaining dielectric layer portion 220b. Accordingly, the overall dielectric area of the second gate dielectric layer 212b is less than the overall dielectric area of the first gate dielectric layer 212a.

As further illustrated in FIG. 15, the first gate dielectric layer 212a and the second gate dielectric layer 212b are fabricated in reverse with respect to one another. For example, the first gate dielectric layer 212a has a left dielectric layer portion 219a with a length (D1) and right dielectric layer portion 220a with a length (D2) greater than D1. The second gate dielectric layer 212b has a left dielectric layer portion 220b with a length (1) and a right dielectric layer portion 219b with a length (D2) that is greater than D1. That is, the length (D1) of the left dielectric layer portion 219a corresponding to the first gate dielectric layer 212a matches the length (D1) of the left dielectric layer portion 220b corresponding to the second gate dielectric layer 212b. However, the thickness of the left dielectric layer portion 219a corresponding to the first gate dielectric layer 212a is less than, for example, the thickness of the left dielectric layer portion 220b of the second gate dielectric layer 212b.

Similarly, the length (D2) of the right dielectric layer portion 220a corresponding to the first gate dielectric layer 212a matches the length (D2) of the right dielectric layer portion 219b corresponding to the second gate dielectric layer 212b. However, the thickness of the right dielectric layer portion 220a corresponding to the first gate dielectric layer 212a is greater than, for example, the thickness of the right dielectric layer portion 219b of the second gate dielectric layer 212b. It should be appreciated that the dimensions of the first and second gate dielectric layers 212a-212b are not limiting. For example, the thickness of the left dielectric layer portion 219a corresponding to the first gate dielectric layer 212a can be greater than the thickness of the left dielectric layer portion 220b corresponding to the second gate dielectric layer 212b, and the thickness of the right dielectric layer portion 220a corresponding to the first gate dielectric layer 212a can be less than the thickness of the right dielectric layer portion 219b corresponding to the second gate dielectric layer 212b.

Figure 16:
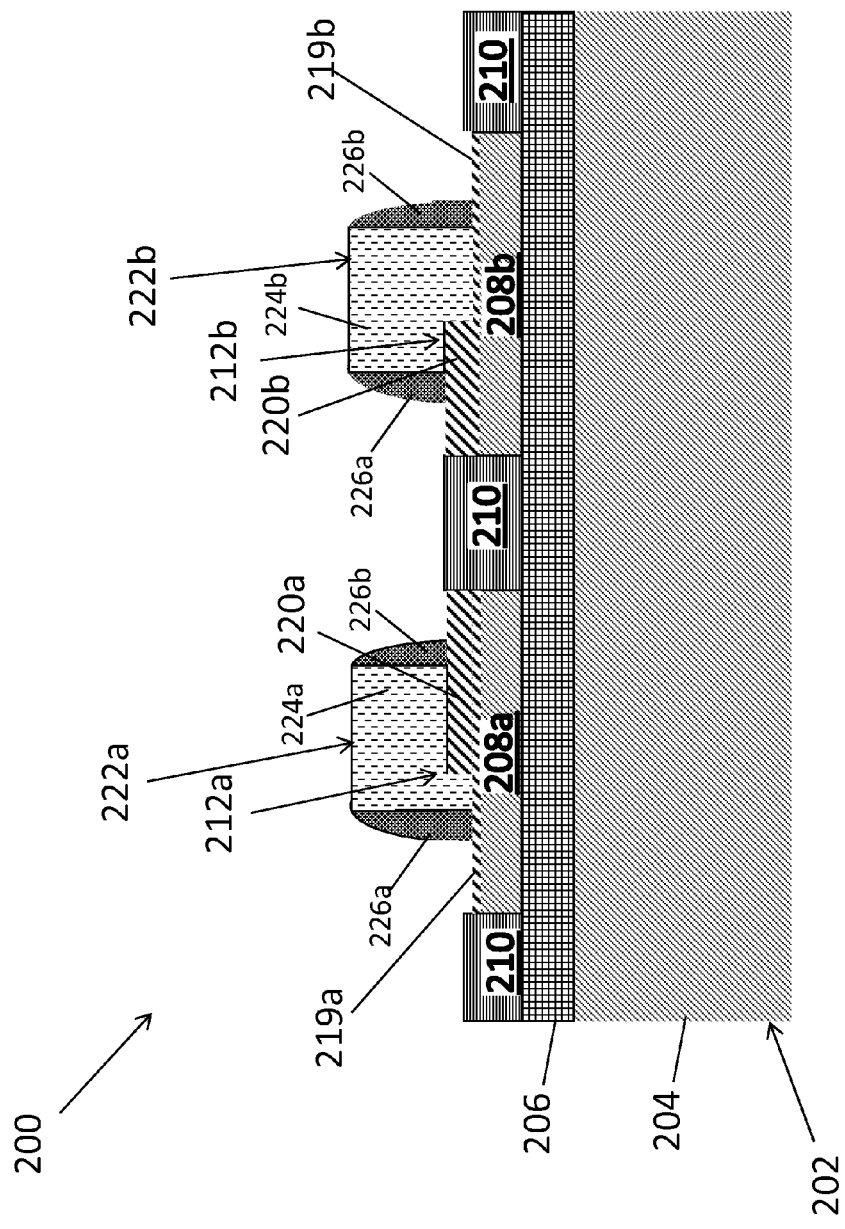

Turning to FIG. 16, a first gate structure 222a is formed on the first gate dielectric layer 212a and a second gate structure 222b is formed on the second gate dielectric layer 212b. Each of the first and second gate structures 222a-222b include an electrode region 224a-224b comprising a dummy gate or metal gate as understood by one of ordinary skill in the art. The gate structures 222a-222b also include spacers 226a-226b formed on the sidewalls of a respective electrode region 224a-224b. The spacers 226a-226b can comprise various materials including, but not limited to, silicon nitride (SiN).

The first gate structure 222a is formed on the first gate dielectric layer 212a such that the first electrode region 224a is disposed partially on the dielectric layer portion 219a and partially on the remaining dielectric layer portion 220a. In a similar manner, the second gate structure 222b is formed on the second gate dielectric layer 212b such that the second electrode region 224b is disposed partially on the dielectric layer portion 219b and partially on the remaining dielectric layer portion 220b. Since, however, the overall second dielectric area (e.g., the overall oxide thickness) of the second gate dielectric layer 212b is less than the overall first dielectric area (e.g., the overall dielectric thickness) of the first gate dielectric layer 212a, the second gate structure 222b has a threshold voltage (Q2_Vt) that is less than the threshold voltage (Q1_Vt) of the first gate structure 222a. In other words, the voltage required to switch on the first gate structure 222a is greater than the voltage required to switch on the second gate structure 222b because the overall dielectric area (e.g., the overall oxide thickness) formed beneath the first gate electrode region 224a is greater than the overall dielectric area (e.g., the overall oxide thickness) formed beneath the second gate electrode region 224b.

Figure 17:
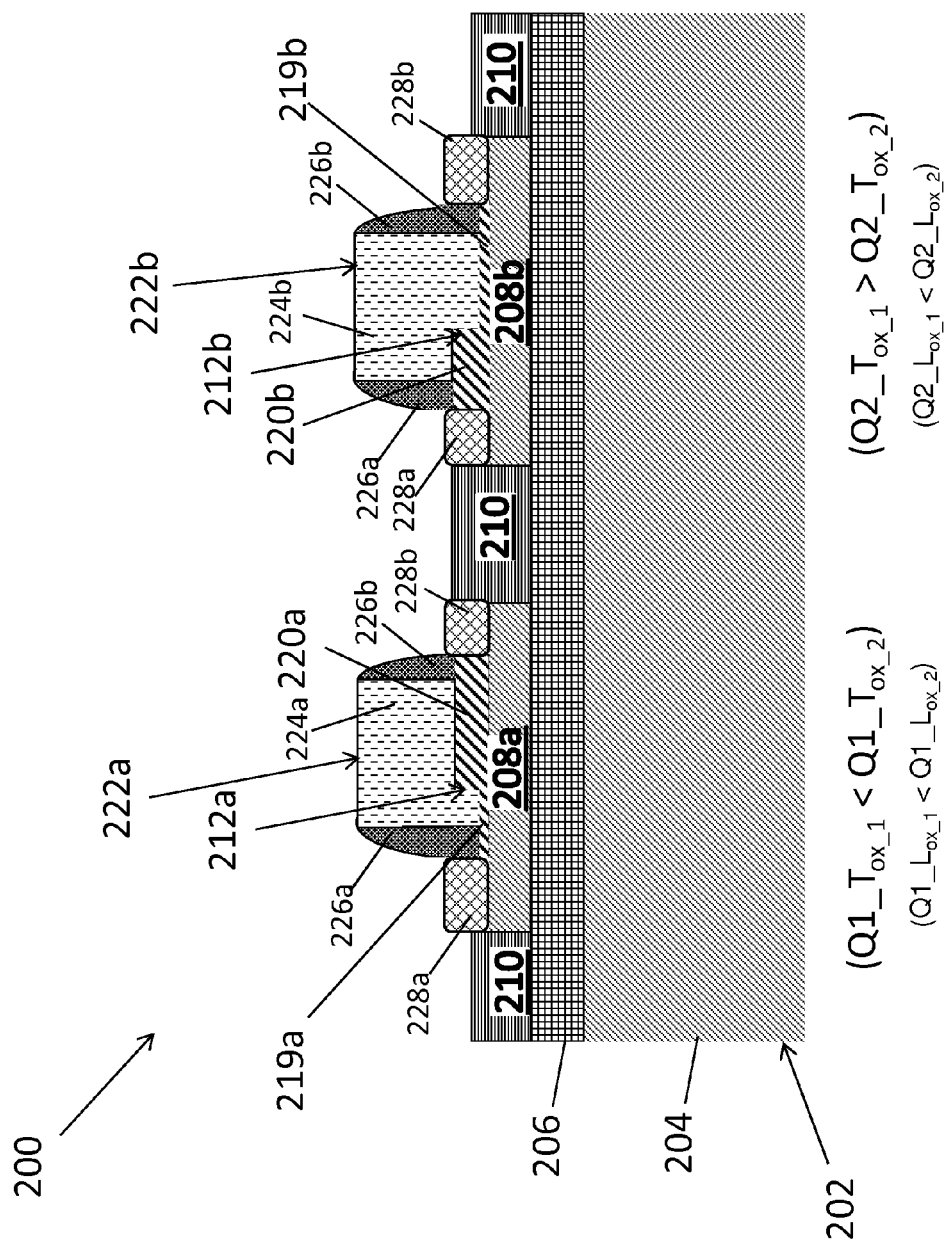

Referring now to FIG. 17, portions of the first gate dielectric layer 212a and the second gate dielectric layer 212b are removed from locations corresponding to source/drain regions of the active semiconductor layers 208a-208b, respectively. Source/drain elements 228a-228b are then formed on the source/drain regions (i.e., the exposed active semiconductor layers 208a-208b) using various techniques including, for example, epitaxy crystalline growth, as understood by one of ordinary skill in the art. Accordingly, a PUF semiconductor device 200 is formed including a pair of gate structures 222a-222b each having a randomly created threshold voltage (Q1_Vt, Q2_Vt) due to the random size variation of the first and second gate dielectric layers 212a-212b formed according to the process flow described in detail above.

A voltage differential between the first threshold voltage (Q1_Vt) and the second voltage threshold (Q2_Vt) can be determined using, for example, a microcontroller (not shown in FIG. 17) as discussed in greater detail below. The microcontroller can further compare the voltage differential to a threshold value to determine either a "0" bit or "1" bit corresponding to the particular PUF semiconductor device 200. For example, if the voltage differential is below the threshold value, the microcontroller assigns a "0" bit output to the PUF semiconductor device 200. If, however, the voltage differential is greater than or equal to the threshold value, the microcontroller assigns a "1" bit output to the PUF semiconductor device 200. Since the voltage differential is based on the random sizing variation between the first gate dielectric layer 212a and second gate dielectric layer 212b, the bit output assigned to the PUF semiconductor device 200 (i.e., the pair of gate structure 222a-222b) is also random.

Accordingly, at least one embodiment provides a PUF semiconductor device 200 that introduces a random variation in the threshold voltage (Vt) between a pair of semiconductor structures which is easy to evaluate but difficult to predict, and practically impossible to recreate. Moreover, since the random variation in Vt is based on the random sizing of the gate dielectric layers of the gate structures, the random variation can be achieved using a standard semiconductor fabrication process flow without introducing additional PUF fabrication processes. As a result, the overall costs to fabricate the PUF semiconductor device 200 are reduced.

Figure 18:
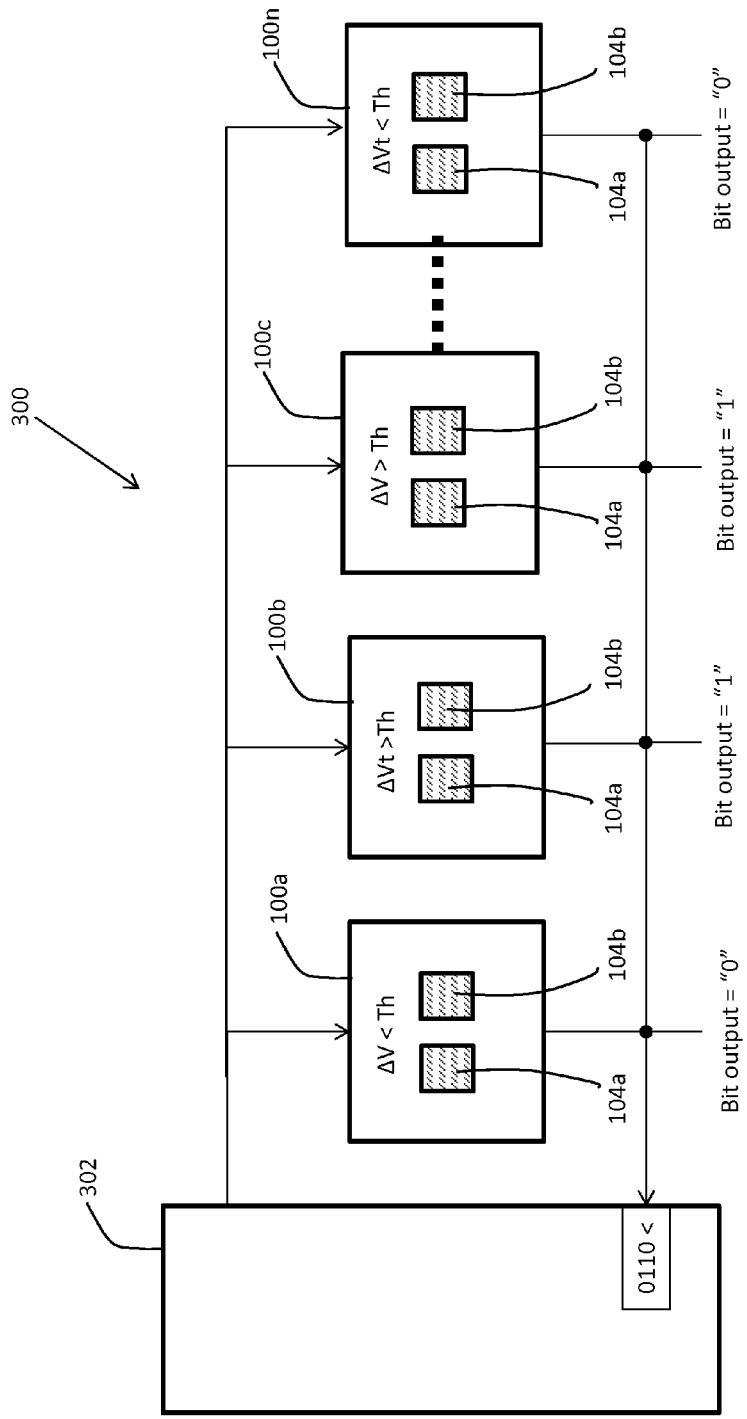
FIG. 18 is a block diagram of a PUF array system including a plurality of PUF semiconductor devices and a microcontroller configured to determine a randomly generated n-bit binary value based on random variations in the threshold voltage differentials of the PUF semiconductor devices.

Referring now to FIG. 18, a block diagram of a PUF array system 300 is illustrated according to a non-limiting embodiment. The PUF array system 300 can include any number of PUF semiconductor devices 100a-100n that are connected to a controller and reader (i.e., microcontroller) 302. Each PUF semiconductor device 100a-100n includes a first gate structure 104a and a second gate structure 104b. The first gate structure 104a has a first threshold voltage (Vt1) and the second gate structure 104b has a second threshold voltage (Vt2).

The microcontroller 302 is configured to provide an input voltage (Vin) and ground potential (Vg) to each PUF semiconductor device 100a-100n of the PUF array 300. In response to the Vin and Vg, the microcontroller 302 determines the first and second voltage thresholds (Vt1,Vt2) and calculates a voltage differential ($\Delta Vt=Vt2-Vt1$). The microcontroller 302 further compares the voltage differential to a threshold value to determine a binary output, i.e., a "0" bit or a "1" bit, corresponding to a respective PUF semiconductor device 100a-100n. For example, if the voltage differential ($\Delta Vt$) is below the threshold value (Th), the microcontroller 302 assigns a "0" bit output to the PUF semiconductor device 100a-100n. If, however, the voltage differential (ΔVt) is greater than or equal to the threshold value, the microcontroller 302 assigns a "1" bit output. The total number of bits output by the PUF array system 300 corresponds to the number of PUF semiconductor device 100a-100n in the PUF array system 300. Since the voltage differential is based on the threshold voltages of the gate structures 104a-104b, which in turn are based on the random sizing of the first dielectric layer and second dielectric layer, the total bit output of the PUF array system 300 is also random. Accordingly, a PUF array system 300 includes a plurality of semiconductor devices 100a-100n having random variations in the gate dielectric layers that introduce a variation in threshold voltages (Vt) which can be easily analyzed but practically impossible to duplicate.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

As used herein, the term module refers to a hardware module including an Application Specific Integrated Circuit (ASIC), an electronic circuit, a processor (shared, dedicated, or group) and memory that execute one or more software or firmware programs, a combinational logic circuit, and/or other suitable components that provide the described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the inventive teachings and the practical application, and to enable others of ordinary skill in the art to understand the invention for various embodiments with various modifications as are suited to the particular use contemplated.

The flow diagrams depicted herein are just one example. There may be many variations to this diagram or the operations described therein without departing from the spirit of the invention. For instance, the operations may be performed in a differing order or operations may be added, deleted or modified. All of these variations are considered a part of the claimed invention.

While various embodiments have been described, it will be understood that those skilled in the art, both now and in the future, may make various modifications which fall within the scope of the claims which follow. These claims should be construed to maintain the proper protection for the invention first described.

What is claimed is:

1. A method of fabricating a physical unclonable function (PUF) semiconductor device, the method comprising:
    forming a first gate dielectric layer having a first shape that defines a first dielectric area on a first active region of a semiconductor substrate, and forming a second gate dielectric layer having a second shape that defines a second dielectric area different from the first dielectric area on a second active region of the semiconductor substrate, the second shape reversely arranged with respect to the first shape;
    forming a first semiconductor structure on the first gate dielectric layer to define a first threshold voltage of the first semiconductor structure, and forming a second semiconductor structure on the second gate dielectric layer to define a second threshold voltage of the second semiconductor structure that is different from the first threshold voltage.

2. The method of claim 1, wherein forming each of the first gate dielectric layer and the second gate dielectric layer further comprises:
    recessing a portion of the first gate dielectric layer to define a first dielectric layer portion of the first gate dielectric layer having a first thickness and a second dielectric layer portion of the first gate dielectric layer having a second thickness that is greater than the first dielectric layer portion of the first gate dielectric layer; and
    recessing a portion of the second gate dielectric layer to define a first dielectric layer portion of the second gate dielectric layer having a first thickness and a second dielectric layer portion of the second gate dielectric layer having a second thickness that is greater than the first dielectric layer portion of the second gate dielectric layer.

3. The method of claim 2, wherein forming each of the first gate dielectric layer and the second gate dielectric layer further comprises:
    forming the first dielectric layer portion of the first gate dielectric layer to define a first length and the second dielectric layer portion of the first gate dielectric layer to define a second length that is different from the first length; and
    forming the first dielectric layer portion of the second gate dielectric layer to define a first length and the second dielectric layer portion of the second gate dielectric layer to define a second length that is different from the first length.

4. The method of claim 3, wherein forming each of the first gate dielectric layer and the second gate dielectric layer further comprises:
    forming the first gate layer portion of the first semiconductor structure with a first thickness and the first dielectric layer portion of the second semiconductor structure with a second thickness that is different from the first thickness of the first semiconductor structure.

5. The method claim 4, further comprising forming a plurality of pairs of semiconductor structures on the semiconductor substrate such that each pair of semiconductor structures has a threshold voltage differential that is different from one another.

6. A method of fabricating a physical unclonable function (PUF) semiconductor device, the method comprising:
   forming a plurality of gate dielectric layers on a semiconductor substrate, each gate dielectric layer having a gate dielectric area that is reversely arranged with respect to one another; and
   forming a semiconductor structure on each gate dielectric layer such that each semiconductor structure has a different threshold voltage defined by a respective gate dielectric area.

7. The method of claim 6, further comprising randomly sizing each gate dielectric area to define random variations of the threshold voltages.

8. The method of claim 7, wherein the forming a plurality of gate dielectric layers includes forming each gate dielectric layer with a first dielectric layer portion and a second dielectric layer portion different from the first dielectric gate portion.

9. The method of claim 8, wherein the forming each gate dielectric layer further comprises forming the first dielectric layer portion having a first thickness and forming the second dielectric layer portion having a second thickness different from the first thickness.

10. The method of claim 9, wherein the forming each gate dielectric layer further comprises forming the first dielectric layer portion having a first length and forming the second dielectric layer portion having a second length different from the first length.

\* \* \* \* \*